United States Patent
Kato

(10) Patent No.: US 10,713,552 B2
(45) Date of Patent: Jul. 14, 2020

(54) RFID TAG MANUFACTURING METHOD, RFID TAG MANUFACTURING DEVICE, AND TRANSFER SHEET MANUFACTURING METHOD

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 3 days.

(21) Appl. No.: 16/283,869

(22) Filed: Feb. 25, 2019

(65) Prior Publication Data

US 2019/0188550 A1 Jun. 20, 2019

Related U.S. Application Data

(63) Continuation of application No. PCT/JP2018/000475, filed on Jan. 11, 2018.

(30) Foreign Application Priority Data

Feb. 1, 2017 (JP) .................................. 2017-016956

(51) Int. Cl.
G06K 19/077 (2006.01)

(52) U.S. Cl.
CPC ....... *G06K 19/0775* (2013.01); *G06K 19/077* (2013.01); *G06K 19/07722* (2013.01); *G06K 19/07745* (2013.01); *G06K 19/07779* (2013.01)

(58) Field of Classification Search
CPC ........ G06K 19/00; G06K 19/04; G06K 19/06; G06K 19/07

USPC ................................. 235/492, 375, 380, 487
See application file for complete search history.

(56) References Cited

U.S. PATENT DOCUMENTS

| | | | | |
|---|---|---|---|---|
| 2007/0040686 A1* | 2/2007 | Reis | ........................ | H01L 24/95 340/572.7 |
| 2014/0218257 A1* | 8/2014 | Takeuchi | ................ | H01P 11/00 343/841 |
| 2017/0017872 A1 | 1/2017 | Kato et al. | | |

FOREIGN PATENT DOCUMENTS

| | | |
|---|---|---|
| JP | 2008010841 A | 1/2008 |
| JP | 2008257420 A | 10/2008 |
| JP | 5904316 B1 | 4/2016 |

(Continued)

OTHER PUBLICATIONS

International Search Report issued for PCT/JP2018/000475, dated Mar. 27, 2018.

(Continued)

*Primary Examiner* — Edwyn Labaze
(74) *Attorney, Agent, or Firm* — Arent Fox LLP

(57) ABSTRACT

An RFID tag manufacturing method is provided that includes arranging a plurality of RFIC elements in a housing tool at a first arrangement density; and extracting an RFIC element group out of the plurality of RFIC elements arranged in the housing tool. Moreover, the extracted RFIC element group has a second arrangement density that is lower than the first arrangement density and that corresponds to an arrangement density of a plurality of antenna patterns arranged on an antenna substrate. The method includes disposing the RFIC element group onto the plurality of antenna patterns of the antenna substrate while maintaining the second arrangement density.

20 Claims, 23 Drawing Sheets

(56) References Cited

FOREIGN PATENT DOCUMENTS

WO  2016203882 A1  12/2016

OTHER PUBLICATIONS

Written Opinion of the International Searching Authority issued for PCT/JP2018/000475, dated Mar. 27, 2018.

\* cited by examiner

RFID TAG MANUFACTURING METHOD, RFID TAG MANUFACTURING DEVICE, AND TRANSFER SHEET MANUFACTURING METHOD

CROSS REFERENCE TO RELATED APPLICATIONS

The present application is a continuation of PCT/JP2018/000475 filed Jan. 11, 2018, which claims priority to Japanese Patent Application No. 2017-016956, filed Feb. 1, 2017, the entire contents of each of which are incorporated herein by reference.

TECHNICAL FIELD

The present disclosure relates to an RFID (Radio Frequency Identification) tag manufacturing method, an RFID tag manufacturing device, and a transfer sheet manufacturing method.

BACKGROUND

Currently, methods of manufacturing RFID tags by using a carrier tape that houses a plurality of RFIC elements with seal materials is known, for example, as described in Patent Document 1 (identified below).

In the manufacturing method of Patent Document 1, the carrier tape is continuously pulled out from a supply reel while pulling out an antenna substrate having antenna elements formed thereon from another supply reel, and the carrier tape and the antenna substrate are brought closer to each other. As a result, the RFIC elements housed in the carrier tape are attached to the tape-shaped antenna substrate. In the manufacturing method of Patent Document 1, this operation is continuously performed to manufacture a plurality of RFID tags.

Patent Document 1: Japanese Patent No. 5904316.

However, since the RFIC elements held by the carrier tape are continuously attached one by one to the tape-shaped antenna substrate, the manufacturing method described in Patent Document 1 can be improved to satisfy both increase in productivity and ensuring of attachment position accuracy.

SUMMARY OF THE INVENTION

Accordingly, an object of the present disclosure is to provide an RFID tag manufacturing method, an RFID tag manufacturing device, and a transfer sheet manufacturing method, that increase the productivity and ensuring the attachment position accuracy.

Thus, an RFID tag manufacturing method of an exemplary aspect includes arranging a plurality of RFIC elements in a housing tool at a first arrangement density; and extracting an RFIC element group out of the plurality of RFIC elements arranged in the housing tool. Moreover, the RFIC element group has a second arrangement density that is lower than the first arrangement density and that corresponds to an arrangement density of a plurality of antenna patterns arranged on an antenna substrate. The method further includes disposing the RFIC element group onto the plurality of antenna patterns of the antenna substrate while maintaining the second arrangement density.

Moreover, an RFID tag manufacturing device of another exemplary aspect includes a housing tool for arranging a plurality of RFIC elements at a first arrangement density; and a disposing device extracting an RFIC element group out of the plurality of RFIC elements arranged in the housing tool. In this aspect, the RFIC element group has a second arrangement density that is lower than the first arrangement density and that corresponds to an arrangement density of a plurality of antenna patterns arranged on an antenna substrate. The method includes disposing the RFIC element group onto the plurality of antenna patterns of the antenna substrate while maintaining the second arrangement density.

Yet further, a transfer sheet manufacturing method of an exemplary aspect includes providing a transfer sheet to which a plurality of RFIC elements is transferred. The exemplary manufacturing method includes arranging a plurality of RFIC elements in a housing tool at a first arrangement density; and bonding an RFIC element group out of the plurality of RFIC elements arranged in the housing tool to a transfer sheet. In this aspect, the RFIC element group has a second arrangement density that is lower than the first arrangement density and that corresponds to an arrangement density of a plurality of antenna patterns arranged on an antenna substrate.

According to the exemplary method of the present invention, the productivity can be increased, and the attachment position accuracy can be ensured.

DETAILED DESCRIPTION

Figure 1:
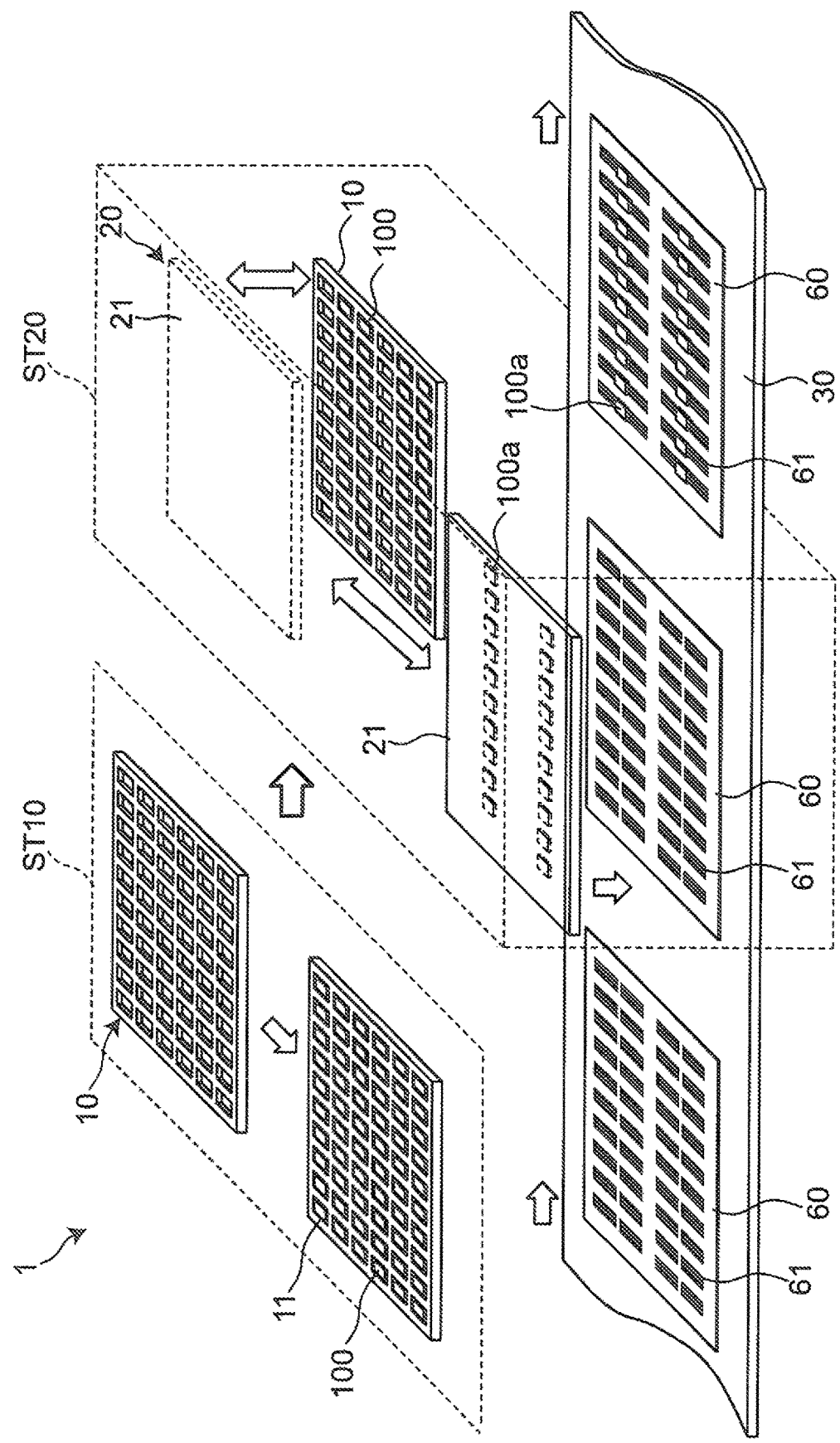
FIG. 1 is a general schematic view of RFID tag manufacturing steps in a first exemplary embodiment.

An RFID tag manufacturing method of an exemplary aspect includes arranging a plurality of RFIC elements in a housing tool at a first arrangement density; and extracting an RFIC element group out of the plurality of RFIC elements arranged in the housing tool. In this aspect, the RFIC element group has a second arrangement density that is lower than the first arrangement density and that corresponds to an arrangement density of a plurality of antenna patterns arranged on an antenna substrate. The method includes disposing the RFIC element group onto the plurality of antenna patterns of the antenna substrate while maintaining the second arrangement density.

Such a configuration can increase the productivity of RFID tags while ensuring the attachment position accuracy.

In the RFID tag manufacturing method, extracting and disposing the RFIC element group may include extracting from the housing tool an RFIC element group including a plurality of RFIC elements arranged in an X direction at an interval that is m or more times as large as an interval of the plurality of RFIC elements arranged in the X direction in the housing tool and disposing the RFIC element group on the plurality of antenna patterns of the antenna substrate while maintaining the interval, and m may be a natural number of 2 or more.

Such a configuration can extract as the RFIC element group a plurality of RFICs having an interval that is m or more times as large as the interval of the plurality of RFIC elements arranged in the X direction in the housing tool and dispose the RFIC element group on the plurality of antenna patterns while maintaining the interval in a position action. As a result, the productivity of RFID tags can further be increased.

In the RFID tag manufacturing method, the plurality of antenna patterns arranged on the antenna substrate may be arranged at an interval A in the X direction and an interval B in a Y direction in a planar view; the plurality of RFIC elements arranged in the housing tool may be arranged at an interval A/m in the X direction and an interval B/n in the Y direction in a planar view; m may be a natural number of 2 or more while n may be a natural number of 1 or more; the number of elements arranged in the X direction of the plurality of RFIC elements arranged in the housing tool may be 2m or more while the number of elements arranged in the Y direction thereof may be n or more; the RFIC element group may include a plurality of RFIC elements arranged at the interval A in the X direction and the interval B in the Y direction in a planar view out of a plurality of RFIC elements in S-th and (S+m)-th rows in the X direction of the housing tool; and S may be a natural number of 1 or more.

With such a configuration, while maintaining the interval A in the X direction and the interval B in the Y direction of the plurality of RFIC elements included in the RFIC element group, the RFIC element group can be disposed on the plurality of antenna patterns arranged at the same interval. As a result, the attachment position accuracy of the RFIC elements can be improved while increasing the productivity.

In the RFID tag manufacturing method, extracting and disposing the RFIC element group may include, by using a transfer sheet, extracting the RFIC element group out of the plurality of RFIC elements arranged in the housing tool, and transferring to the antenna substrate.

With such a configuration, the RFIC element group can easily be disposed on the plurality of antenna patterns by using the transfer sheet, so that the productivity can further be increased.

In the RFID tag manufacturing method, extracting and disposing the RFIC element group may include extracting the RFIC element group by bonding the plurality of RFIC elements arranged in the housing tool to the transfer sheet via a mask having a plurality of through-holes formed at the second arrangement density.

With such a configuration, the mask makes the extraction of the RFIC element group easier, so that the productivity can be further increased.

In the RFID tag manufacturing method, extracting and disposing the RFIC element group may include transferring the RFIC element group together with the transfer sheet to the plurality of antenna patterns of the antenna substrate.

With such a configuration, by transferring the transfer sheet along with the RFIC element group disposed on the plurality of antenna patterns, the transfer sheet can be used as a protective cover for the RFID tags. This eliminates the need for a step of separately attaching a protective cover to the RFID tags, so that the productivity can further be increased.

In the RFID tag manufacturing method, extracting and disposing the RFIC element group may include, by using a plurality of suction nozzles, extracting the RFIC element group out of the plurality of RFIC elements arranged in the housing tool, and disposing the RFIC element group onto the plurality of antenna patterns of the antenna substrate.

With such a configuration, the RFIC element group can easily be disposed on the plurality of antenna patterns by the plurality of suction nozzles, so that the productivity can further be increased.

In the RFID tag manufacturing method, extracting and disposing the RFIC element group may include, after disposing the RFIC element group on the plurality of antenna patterns of the antenna substrate, extracting another RFIC element group, from a plurality of RFIC elements arranged in rows different from the rows from which the RFIC element group is extracted in the housing tool, and disposing the another RFIC element group onto a plurality of antenna patterns of another antenna substrate.

With such a configuration, a plurality of RFIC element groups can continuously be disposed on pluralities of antenna patterns of a plurality of antenna substrates, so that the productivity can further be increased.

An RFID tag manufacturing device of another exemplary aspect includes a housing tool for arranging a plurality of RFIC elements at a first arrangement density; and an disposing device extracting an RFIC element group out of the plurality of RFIC elements arranged in the housing tool. In this aspect, the RFIC element group has a second arrangement density that is lower than the first arrangement density and that corresponds to an arrangement density of a plurality of antenna patterns arranged on an antenna substrate. The method includes disposing the RFIC element group onto the plurality of antenna patterns of the antenna substrate while maintaining the second arrangement density.

Such a configuration can increase the productivity of RFID tags while ensuring the attachment position accuracy.

In the RFID tag manufacturing device, the disposing device may extract from the housing tool an RFIC element group including a plurality of RFIC elements arranged in an X direction at an interval that is m or more times as large as an interval of the plurality of RFIC elements arranged in the X direction in the housing tool and dispose the RFIC element group on the plurality of antenna patterns of the antenna substrate while maintaining the interval, and m may be a natural number of 2 or more.

Such a configuration can extract as the RFIC element group a plurality of RFICs having an interval that is m or more times as large as the interval of the plurality of RFIC elements arranged in the X direction in the housing tool and dispose the RFIC element group on the plurality of antenna patterns while maintaining the interval. As a result, the productivity of RFID tags can further be increased.

In the RFID tag manufacturing device, the plurality of antenna patterns arranged on the antenna substrate may be arranged at an interval A in the X direction and an interval B in a Y direction in a planar view; the plurality of RFIC elements arranged in the housing tool may be arranged at an interval A/m in the X direction and an interval B/n in the Y direction in a planar view, wherein m may be a natural number of 2 or more while n may be a natural number of 1 or more; the number of elements arranged in the X direction of the plurality of RFIC elements arranged in the housing tool may be 2m or more while the number of elements arranged in the Y direction thereof may be n or more; the RFIC element group may include a plurality of RFIC elements arranged at the interval A in the X direction and the interval B in the Y direction in a planar view out of a plurality of RFIC elements in S-th and (S+m)-th rows in the X direction of the housing tool; and S may be a natural number of 1 or more.

With such a configuration, while maintaining the interval A in the X direction and the interval B in the Y direction of the plurality of RFIC elements included in the RFIC element group, the RFIC element group can be disposed on the plurality of antenna patterns arranged at the same interval. As a result, the attachment position accuracy of the RFIC elements can be improved while increasing the productivity.

In the RFID tag manufacturing device, the disposing device may include a holding tool holding a transfer sheet for extracting the RFIC element group out of the plurality of RFIC elements arranged in the housing tool and transferring the RFIC element group to the antenna substrate.

With such a configuration, the RFIC element group can easily be disposed on the plurality of antenna patterns with the transfer sheet held by the holding tool, so that the productivity can further be increased.

In the RFID tag manufacturing device, the disposing device may include a mask having a plurality of through-holes formed at an arrangement density corresponding to the second arrangement density.

With such a configuration, the mask makes the extraction of the RFIC element group easier, so that the productivity can be further increased.

In the RFID tag manufacturing device, the holding tool may detach the transfer sheet when the RFIC element group is disposed on the plurality of antenna patterns of the antenna substrate and transfer the RFIC element group together with the transfer sheet to the plurality of antenna patterns of the antenna substrate.

With such a configuration, by transferring the transfer sheet along with the RFIC element group disposed on the plurality of antenna patterns, the transfer sheet can be used as a protective cover for the RFID tags. This eliminates the need for separately providing a device attaching a protective cover to the RFID tags, so that the productivity can further be increased.

In the RFID tag manufacturing device, the disposing device may include a plurality of suction nozzles extracting the RFIC element group out of the plurality of RFIC elements arranged in the housing tool and disposing the RFIC element group onto the plurality of antenna patterns of the antenna substrate.

With such a configuration, the RFIC element group can easily be disposed on the plurality of antenna patterns by the plurality of suction nozzles, so that the productivity can further be increased.

In the RFID tag manufacturing device, after disposing the RFIC element group on the plurality of antenna patterns of the antenna substrate, the disposing device may extract another RFIC element group from a plurality of RFIC elements arranged in rows different from the rows from which the RFIC element group is extracted in the housing tool, and disposes the another RFIC element group onto a plurality of antenna patterns of an antenna substrate.

With such a configuration, a plurality of RFIC element groups can continuously be disposed on pluralities of antenna patterns of a plurality of antenna substrates, so that the productivity can further be increased.

A manufacturing method of an exemplary aspect includes manufacturing a transfer sheet to which a plurality of RFIC elements is transferred. The exemplary method includes arranging a plurality of RFIC elements in a housing tool at a first arrangement density; and bonding an RFIC element group out of the plurality of RFIC elements arranged in the housing tool to a transfer sheet. Moreover, the RFIC element group has a second arrangement density that is lower than the first arrangement density and that corresponds to an arrangement density of a plurality of antenna patterns arranged on an antenna substrate.

Such a configuration enables manufacturing of the transfer sheet configured to increase the productivity of RFID tags while ensuring the attachment position accuracy.

In the transfer sheet manufacturing method, bonding the RFIC element group to the transfer sheet may include extracting from the housing tool the RFIC element group including a plurality of RFIC elements arranged in an X direction at an interval that is m or more times as large as an interval of the plurality of RFIC elements arranged in the X direction in the housing tool and bonding the RFIC element group to the transfer sheet while maintaining the interval, and m may be a natural number of 2 or more.

Such a configuration can extract as the RFIC element group a plurality of RFICs having an interval that is m or more times as large as the interval of the plurality of RFIC elements arranged in the X direction in the housing tool and bond the RFIC element group to the transfer sheet while maintaining the interval. As a result, the productivity of RFID tags can further be increased.

In the transfer sheet manufacturing method, the plurality of antenna patterns arranged on the antenna substrate may be arranged at an interval A in the X direction and an interval B in a Y direction in a planar view; the plurality of RFIC elements arranged in the housing tool may be arranged at an interval A/m in the X direction and an interval B/n in the Y direction in a planar view; m may be a natural number of 2 or more while n may be a natural number of 1 or more; the number of elements arranged in the X direction of the plurality of RFIC elements arranged in the housing tool may be 2m or more while the number of elements arranged in the Y direction thereof may be n or more; the RFIC element group may include a plurality of RFIC elements arranged at the interval A in the X direction and the interval B in the Y direction in a planar view out of a plurality of RFIC elements in S-th and (S+m)-th rows in the X direction of the housing tool; and S may be a natural number of 1 or more.

With such a configuration, the RFIC element group including the plurality of RFIC elements having the same interval as the interval of the plurality of antenna patterns can be bonded to the transfer sheet. This enables manufacturing of the transfer sheet that is configured to improve the attachment position accuracy of the RFIC elements while increasing the productivity of the RFID tags.

In the transfer sheet manufacturing method, bonding the RFIC element group to a transfer sheet may include bonding the plurality of RFIC elements arranged in the housing tool to the transfer sheet via a mask having a plurality of through-holes formed at an arrangement density corresponding to the second arrangement density.

With such a configuration, the mask makes the extraction of the RFIC element group easier, so that the transfer sheet can easily be manufactured.

A first embodiment of the present invention will now be described with reference to the accompanying drawings. In the figures, elements are shown in an exaggerated manner to facilitate description.

First Embodiment

[RFID Tag Manufacturing Method]

An RFID tag manufacturing method of a first embodiment will be described.

Figure 2:
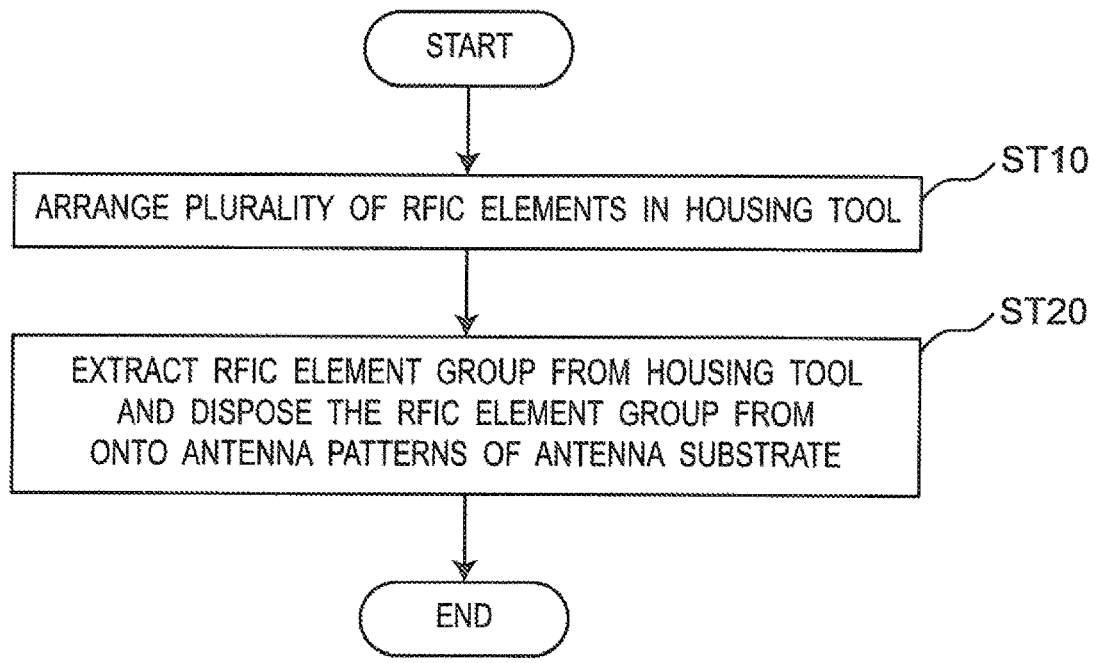
FIG. 2 is a diagram showing an example of a flowchart of an RFID tag manufacturing method in the first exemplary embodiment.

FIG. 1 shows a general schematic view of RFID tag manufacturing steps of a first embodiment. FIG. 2 shows an example of a flowchart of the RFID tag manufacturing method of the first embodiment. The steps shown in FIGS. 1 and 2 show steps of an RFID tag manufacturing method performed by an RFID tag manufacturing device 1.

As shown in FIGS. 1 and 2, the RFID tag manufacturing method includes an arranging step ST10 of arranging a plurality of RFIC elements 100 in a housing tool 10 and a disposing step ST20 of extracting an RFIC element group 100a from the plurality of the RFIC elements 100 and disposing the RFIC element group 100a onto an antenna substrate (cut sheet) 60.

<Arranging Step>

The arranging step ST10 is a step of arranging the plurality of the RFIC elements 100 in the housing tool 10.

Figure 3:
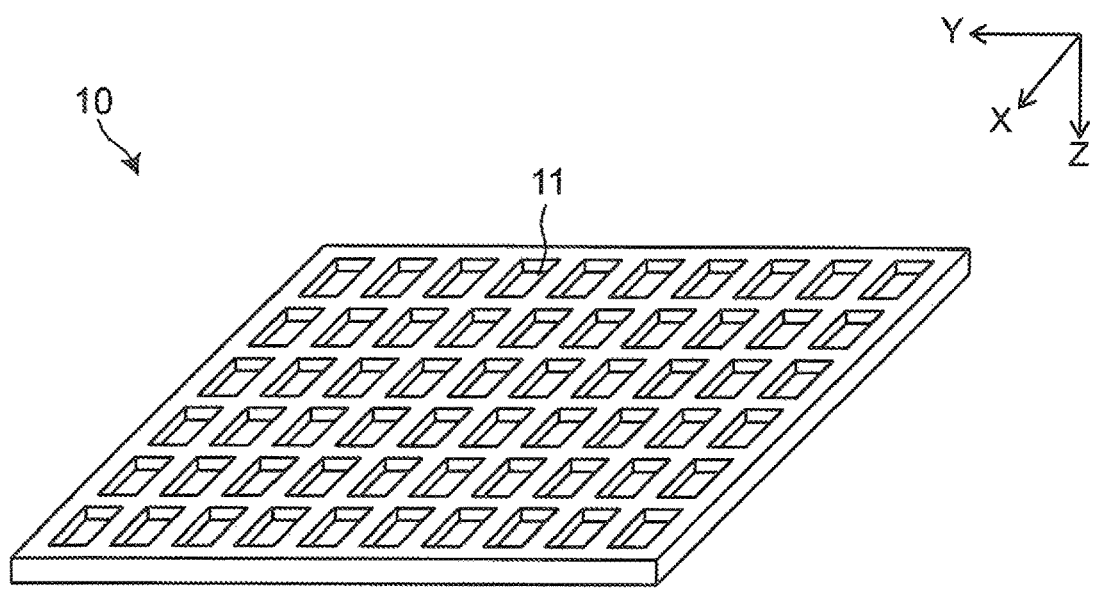
FIG. 3 is a schematic view of a housing tool of an RFID tag manufacturing device in the first exemplary embodiment.

The housing tool 10 used in the arranging step ST10 will be described. In particular, FIG. 3 shows a schematic view of the housing tool 10 of the RFID tag manufacturing device 1 according to the first embodiment of the present invention. In FIG. 3, an X direction, a Y direction, and a Z direction mean a length direction of the housing tool 10, a width direction of the housing tool 10, and a thickness direction of the housing tool 10, respectively.

As shown in FIG. 3, the housing tool 10 is formed into a flat plate shape and includes a plurality of housing parts 11 (e.g., housing spaces or recesses) configured to house the plurality of the RFIC elements 100. The housing parts 11 are recesses having spaces configured to house the RFIC elements 100 one by one, respectively. The plurality of the housing parts 11 is periodically formed in the X direction and the Y direction in a planar view. The housing tool is not necessarily limited to those having housing parts (pockets).

In the first embodiment, the housing parts 11 are each formed in a rectangular shape in a planar view, i.e., as viewed in the Z direction. The plurality of the RFIC elements 100 is arranged in the housing tool 10 with upper surfaces of the RFIC elements 100 exposed from the housing parts 11. For example, the depth of the housing parts 11 in the Z direction is formed smaller than the height of the RFIC elements 100 in the Z direction. Therefore, the RFIC elements 100 can easily be extracted from the housing tool 10 in the disposing step ST20 described later.

In the first embodiment, the plurality of the housing parts 11 is regularly formed in the X direction and the Y direction. Specifically, the plurality of the housing parts 11 is formed at regular intervals into a matrix shape in a planar view. The housing tool 10 shown in FIG. 3 has a total of the 60 housing parts 11 formed in six rows in the X direction and ten lines in the Y direction in a planar view. However, it should be noted that the housing tool 10 of the first embodiment is an example and the present invention is not limited to this configuration and specifically to the 60 housing parts 11.

Figure 4A:
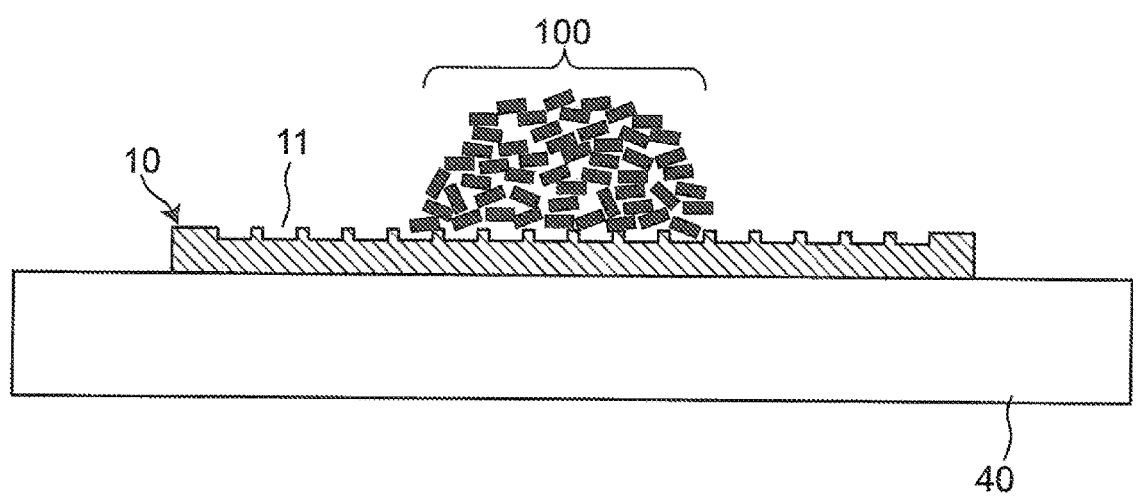
FIG. 4A is a view showing an example of an arranging step of the RFID tag manufacturing method in the first exemplary embodiment.
Figure 4B:
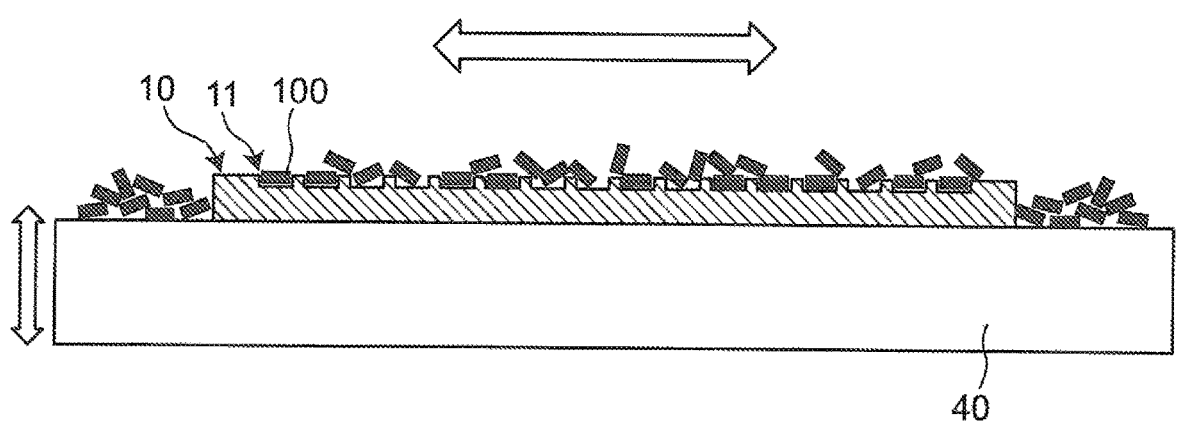
FIG. 4B is a view showing an example of the arranging step of the RFID tag manufacturing method in the first exemplary embodiment.
Figure 4C:
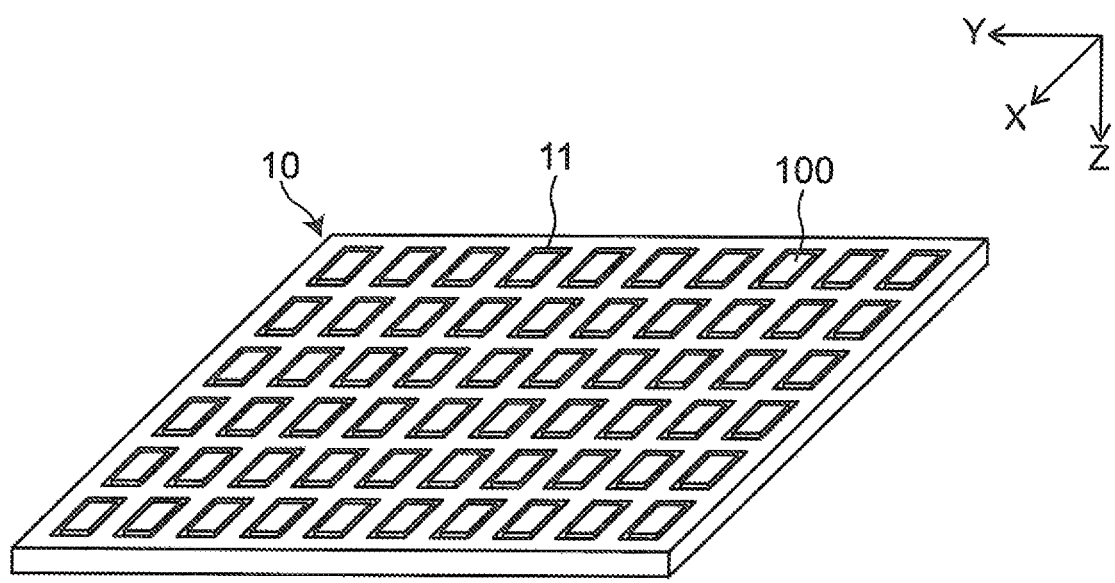
FIG. 4C is a view showing an example of the arranging step of the RFID tag manufacturing method in the first exemplary embodiment.

The arranging step ST10 will be described in detail with reference to FIGS. 4A to 4C. FIGS. 4A to 4C are views showing an example of the arranging step ST10 of the RFID tag manufacturing method in the first embodiment.

As shown in FIG. 4A, the housing tool 10 is mounted on a vibrating device 40. The plurality of the RFIC elements 100 larger in number than the number of the housing parts is placed on the housing tool 10.

As shown in FIG. 4B, the housing tool 10 is vibrated by the vibrating device 40 while the plurality of the RFIC elements 100 are placed on the housing tool 10. As a result, the RFIC elements 100 are housed in the respective housing parts 11 one by one. The extra RFIC elements drop outside the housing parts.

As shown in FIG. 4C, after the RFIC elements 100 are housed in all the housing parts 11 of the housing tool 10, the housing tool 10 is removed from the vibrating device 40.

In this way, in the arranging step ST10, the plurality of the RFIC elements 100 is arranged in the housing tool 10. In the first embodiment, in the arranging step ST10, the plurality of the RFIC elements 100 is arranged in the housing tool 10 at a first arrangement density. As used herein, the "arrangement density" means the number of pieces per unit area, and the "first arrangement density" means the arrangement density of the RFIC elements 100 arranged in the housing tool 10.

<Disposing Step>

Returning to FIGS. 1 and 2, the disposing step ST20 is a step of extracting the RFIC element group 100a from the plurality of the RFIC elements 100 arranged in the housing tool 10 and disposing the RFIC element group 100a onto a plurality of the antenna patterns 61 of the antenna substrate 60. Specifically, in the disposing step ST20, the RFIC element group 100a having a second arrangement density lower than the first arrangement density and corresponding to the arrangement density of the plurality of the antenna patterns 61 arranged on the antenna substrate 60 is extracted out of the plurality of the RFIC elements 100 arranged in the housing tool 10. Subsequently, the RFIC element group 100a is disposed on the plurality of the antenna patterns 61 of the antenna substrate 60 while maintaining the second arrangement density. As used herein, the "second arrangement density" means the arrangement density of the plurality of the RFIC elements 100 arranged in the extracted RFIC element group 100a, i.e., the arrangement density corresponding to the arrangement density of the antenna pattern 61.

It is noted that according to the first exemplary embodiment, the phrase "the RFIC element group 100a having a second arrangement density lower than the first arrangement density and corresponding to the arrangement density of the plurality of the antenna patterns 61 arranged on the antenna substrate 60 is extracted out of the plurality of the RFIC elements 100 arranged in the housing tool 10" means, for example, that the RFIC element group 100a is extracted to make intervals between the multiple antenna patterns 61 equal to intervals between the multiple RFIC elements 100 included in the RFIC element group 100a.

The disposing step ST20 is performed by a disposing device 20 of the RFID tag manufacturing device 1.

Figure 5:
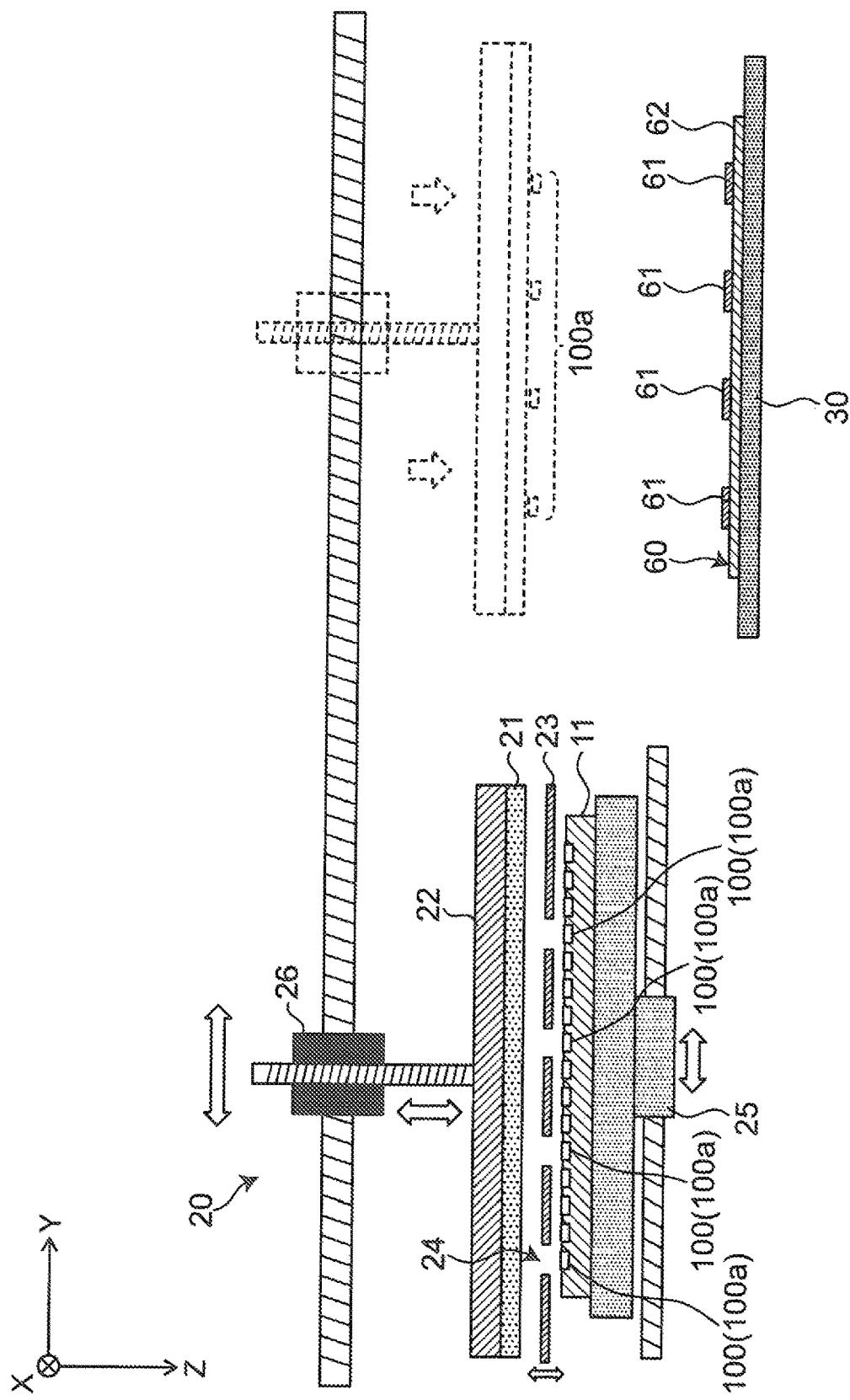
FIG. 5 is a schematic view of a disposing device in the RFID tag manufacturing device in the first exemplary embodiment.

The disposing device 20 used in the disposing step ST20 will be described. FIG. 5 shows a schematic view of the disposing device 20 of the manufacturing device 1 according to the first embodiment of the present invention. As shown in FIG. 5, the disposing device 20 includes a holding tool 22 holding a transfer sheet 21, a mask 23 having a plurality of through-holes 24, a stage 25 configured to move the housing tool 10, a moving device 26 configured to move the holding tool 22, and a conveying stage 30 conveying the antenna substrate 60.

In the first embodiment, the transfer sheet 21 is used for extracting the RFIC element group 100a from the plurality of the RFIC elements 100 arranged in the housing tool 10 and disposing the RFIC element group 100a onto the plurality of the antenna patterns 61 of the antenna substrate 60.

The transfer sheet 21 is formed into a sheet shape having flexibility and a cushioning property, for example, and has adhesiveness on a surface on the side coming into contact with the RFIC elements 100. Specifically, in the exemplary aspect, the transfer sheet 21 is provided with an adhesive member on the surface on the side coming into contact with the RFIC elements 100. The adhesive member may be a heat seal having an adhesive force varying depending on heat, for example. In the first embodiment, the adhesive surface of the transfer sheet 21 is pressed against the plurality of the RFIC elements 100 arranged in the housing tool 10 via the mask 23. As a result, the RFIC element group 100a can be bonded to the transfer sheet 21. Subsequently, the transfer sheet 21 can be pulled up to extract the RFIC group 100a.

The holding tool 22 holds the transfer sheet 2l. The holding tool 22 holds the transfer sheet 21 by a vacuum nozzle, for example. The holding tool 22 is attached to the moving device 26. Therefore, the holding tool 22 can move in the height direction (Z direction) and the left and right directions (X direction and Y direction).

The mask 23 is formed into a flat plate shape, for example, and is disposed between the transfer sheet 21 and the housing tool 10. In the exemplary aspect, the mask 23 is made of a material having at least a surface not bonded to the adhesive surface of the transfer sheet 21. As shown, the mask 23 has the plurality of the through-holes 24. The plurality of the through-holes 24 is formed such that the RFIC elements 100 (the RFIC element group 100a) desired to be extracted from the housing tool 10 are brought into contact with the adhesive surface of the transfer sheet 21. In the first embodiment, the plurality of the through-holes 24 is formed at an arrangement density corresponding to the second arrangement density. Specifically, the plurality of the through-holes 24 is formed at the same intervals as the intervals between the plurality of the antenna patterns 61 arranged on the antenna substrate 60.

The stage 25 is a movable stage configured to move the housing tool 10 in the X direction and the Y direction. The stage 25 can move the housing tool 10 to under the transfer sheet 21. The stage 25 moves the housing tool 10 in the X direction or the Y direction to adjust the positions of the plurality of the RFIC elements 100 arranged in the housing tool 10 relative to the plurality of the through-holes 24 of the mask 23. Specifically, the position of the housing tool 10 is adjusted such that the respective through-holes 24 overlap with the respective RFIC elements 100 of the RFIC element group 100a in a planar view, i.e., as viewed in the Z direction. In other words, the stage 25 moves the housing tool 10 to dispose the RFIC elements 100 desired to be extracted from the housing tool 10 as the RFIC element group 100a under the plurality of the through-holes 24 of the mask 23.

After all the RFIC elements 100 arranged in the housing tool 10 are extracted, the stage 25 can move the housing tool 10 to another place for replacement with another housing tool 10.

The moving device 26 is a device moving the holding tool 22 in the height direction (Z direction) and the left and right directions (X direction and Y direction). Specifically, the moving device 26 moves the holding tool 22 holding the transfer sheet 21 in the Z direction, i.e., toward the housing tool 10, to press the adhesive surface of the transfer sheet 21 against the plurality of the RFIC elements 100 of the housing tool 10 via the plurality of the through-hole 24 of the mask 23. As a result, the plurality of the RFIC elements 100 desired to be extracted as the RFIC element group 100a is bonded to the transfer sheet 21. The moving device 26 then moves the holding tool 22 in the direction opposite to the housing tool 10 to pull up the transfer sheet 21 having the RFIC element group 100a bonded thereto from the housing tool 10. Subsequently, the moving device 26 moves the holding tool 22 to the conveying stage 30 conveying the antenna substrate 60. The moving device 26 performs alignment by using camera etc. such that the RFIC element group 100a is disposed on the plurality of the antenna patterns 61 of the antenna substrate 60 and moves the holding tool 22 toward the antenna substrate 60. As a result, the transfer sheet 21 having the RFIC element group 100a bonded thereto is transferred to the antenna substrate 60.

The conveying stage 30 is a belt conveyer conveying the antenna substrate 60 having the plurality of the antenna patterns 61. The conveying stage 30 is configured to sequentially convey the antenna substrate 60 without the RFIC elements 100 mounted thereof and conveys the antenna substrate 60 with the RFIC elements 100 mounted thereof to a singulating device (not shown).

Figure 6:
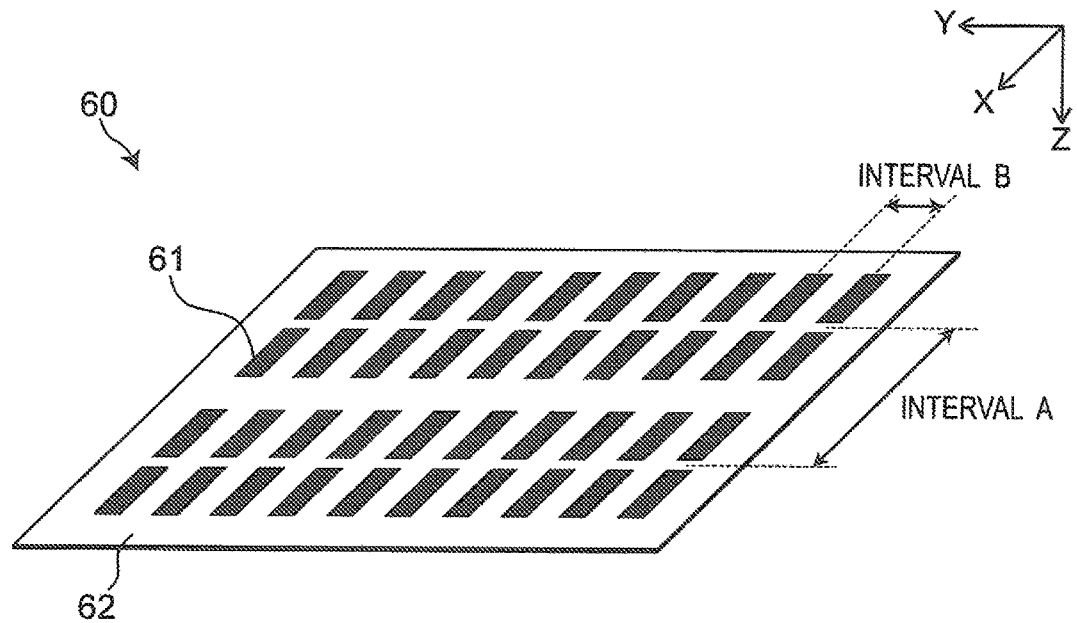
FIG. 6 is a perspective view showing an example of an antenna substrate.

FIG. 6 is a perspective view showing an example of the antenna substrate 60. As shown in FIG. 6, the antenna substrate 60 in the first embodiment has the plurality of the antenna patterns 61 arranged at an interval A in the X direction and at intervals B in the Y direction on abase film 62 for dipole antennas each having a pair of dipole elements. In the first embodiment, the plurality of the antenna patterns 61 is arranged in two rows in the X direction and ten lines in the Y direction in a planar view. The intervals A and B are intervals between centers of regions on which the RFIC element 100 is mounted. It should be appreciated that for the first embodiment, the antenna substrate 60 as shown is not limited to this specific configuration.

The disposing step ST20 will be described in detail with reference to FIGS. 7A to 7G. FIGS. 7A to 7G are views showing an example of the disposing step ST20 of the RFID tag manufacturing method in the first embodiment. In FIGS. 7A to 7G, the holding tool 22, the stage 25, the moving device 26, and the conveying stage 30 are not shown for simplification of description.

Figure 7A:
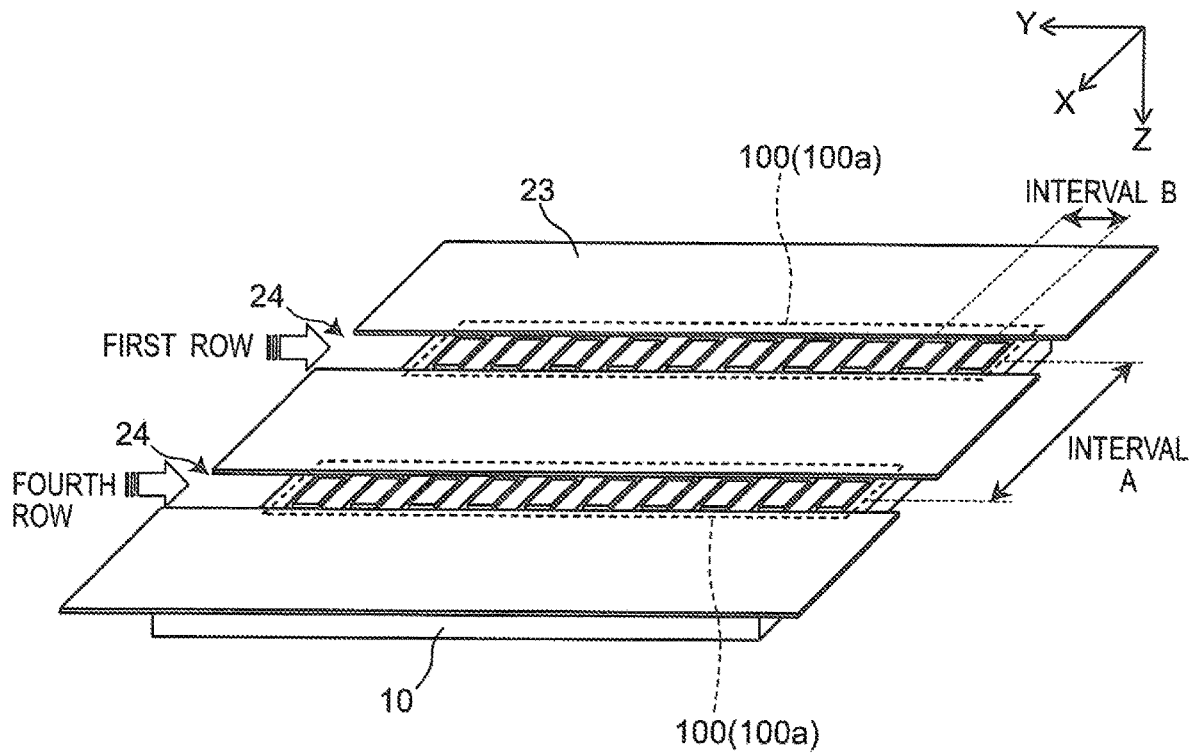
FIG. 7A is a view showing an example of a disposing step of the RFID tag manufacturing method in the first exemplary embodiment.

As shown in FIG. 7A, the stage 25 moves the housing tool 10 to dispose the plurality of the RFIC elements 100 arranged in the first and fourth rows in the X direction of the housing tool 10 under the plurality of the through-holes 24 of the mask 23. Specifically, the position of the housing tool 10 is adjusted such that the whole of the RFIC elements 100 arranged in the first and fourth rows in the X direction of the housing tool 10 can be seen from the through-hole 24 of the mask 23 as viewed in the Z direction.

In the first embodiment, the plurality of the antenna patterns 61 of the antenna substrate 60 is arranged at the interval A in the X direction and at the intervals B in the Y direction, while the intervals of the plurality of the housing parts 11 of the housing tool 10 are formed as intervals A/3 in the X direction and the intervals B in the Y direction in a planar view. Therefore, a plurality of the RFIC elements 100 arranged in the first row and a plurality of the RFIC elements 100 arranged in the fourth row in the X direction of the housing tool 10 are arranged at the interval A in the X direction. Moreover, the plurality of the RFIC elements 100 arranged in the first row and the plurality of the RFIC elements 100 arranged in the fourth row in the X direction of the housing tool 10 are each arranged at the intervals B in the Y direction.

In the first embodiment, the plurality of the through-holes 24 of the mask 23 is formed at the interval A in the X direction and is formed continuously in the Y direction.

Figure 7B:
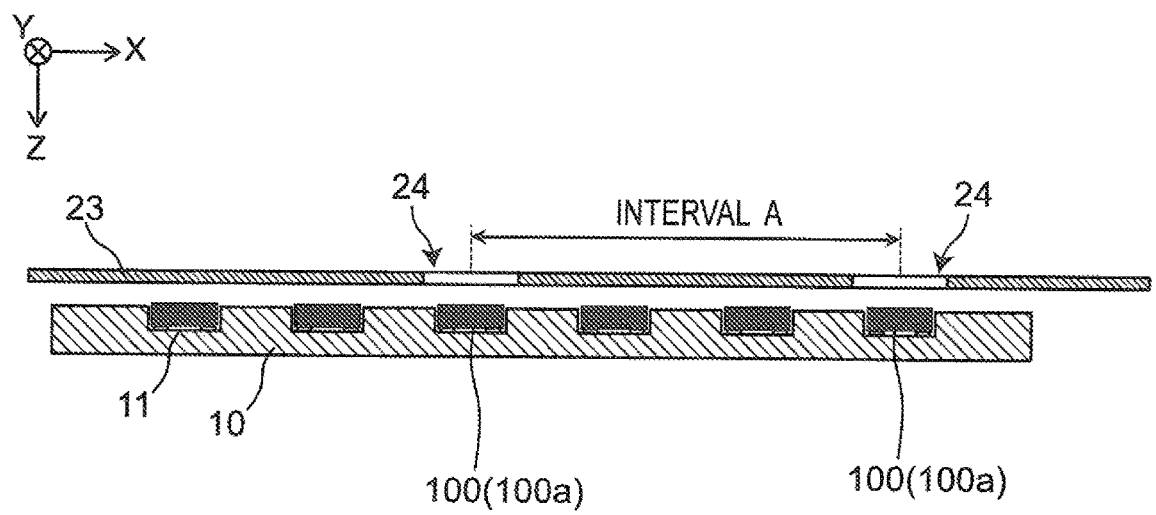
FIG. 7B is a view showing an example of the disposing step of the RFID tag manufacturing method in the first exemplary embodiment.

Therefore, as shown in FIG. 7B, the plurality of the RFIC elements 100 desired to be extracted as the RFIC element group 100a, i.e., the plurality of the RFIC elements 100 arranged in the first and fourth rows in the X direction of the housing tool 10, is disposed under the through-holes 24 of the mask 23 as viewed in the Y direction.

Figure 7C:
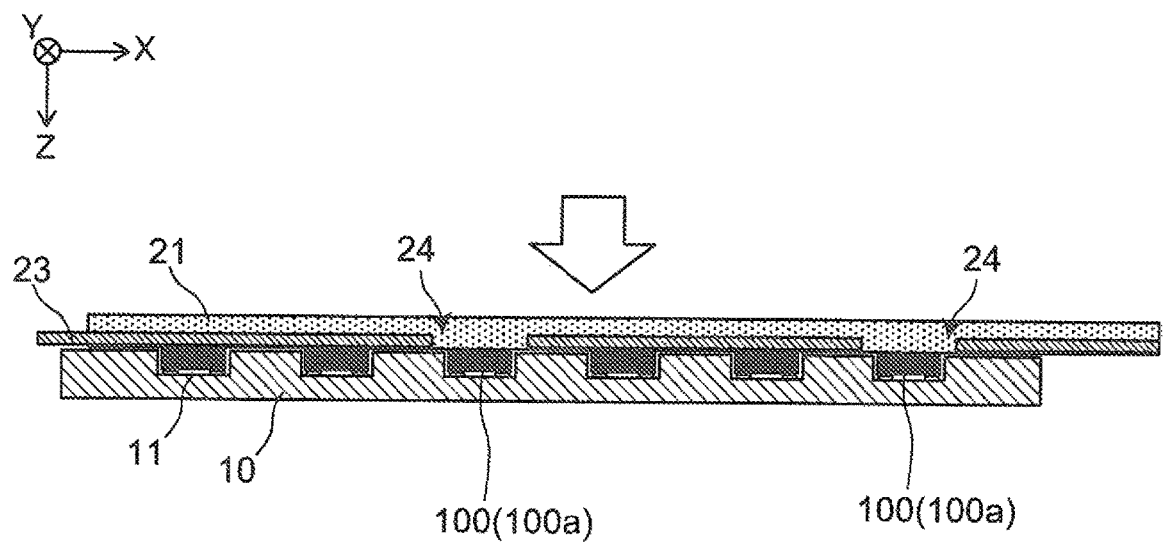
FIG. 7C is a view showing an example of the disposing step of the RFID tag manufacturing method in the first exemplary embodiment.

As shown in FIG. 7C, the mask 23 is lowered onto the housing tool 10. The holding tool 22 holding the transfer sheet 21 is then moved toward the housing tool 10 by the moving device 26. As a result, the transfer sheet 21 is pressed against the housing tool 10 via the mask 23. Specifically, the adhesive surface of the transfer sheet 21 comes into contract with the upper surfaces of the plurality of the RFIC elements 100 arranged in the first and fourth rows in the X direction of the housing tool 10, i.e., the upper surfaces of the RFIC element group 100a through the plurality of the through-holes 24 of the mask 23. As a result, the RFIC element group 100a is bonded to the adhesive surface of the transfer sheet 21. In other words, the RFIC element group 100a is transferred to the transfer sheet 21 concurrently at the same time.

Figure 7D:
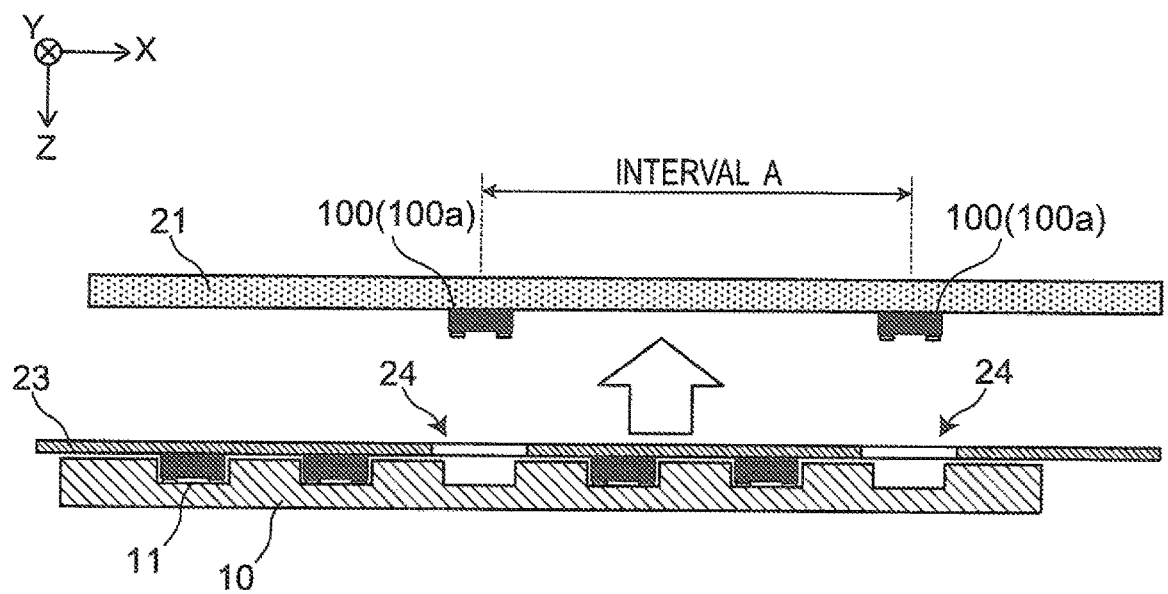
FIG. 7D is a view showing an example of the disposing step of the RFID tag manufacturing method in the first exemplary embodiment.

As shown in FIG. 7D, the holding tool 22 holding the transfer sheet 21 is moved by the moving device 26 in the direction opposite to the housing tool 10. As a result, the RFIC element group 100a including the plurality of the RFIC elements 100 arranged at the interval A in the X direction and the intervals B in the Y direction can be extracted from the housing tool 10.

Figure 7E:
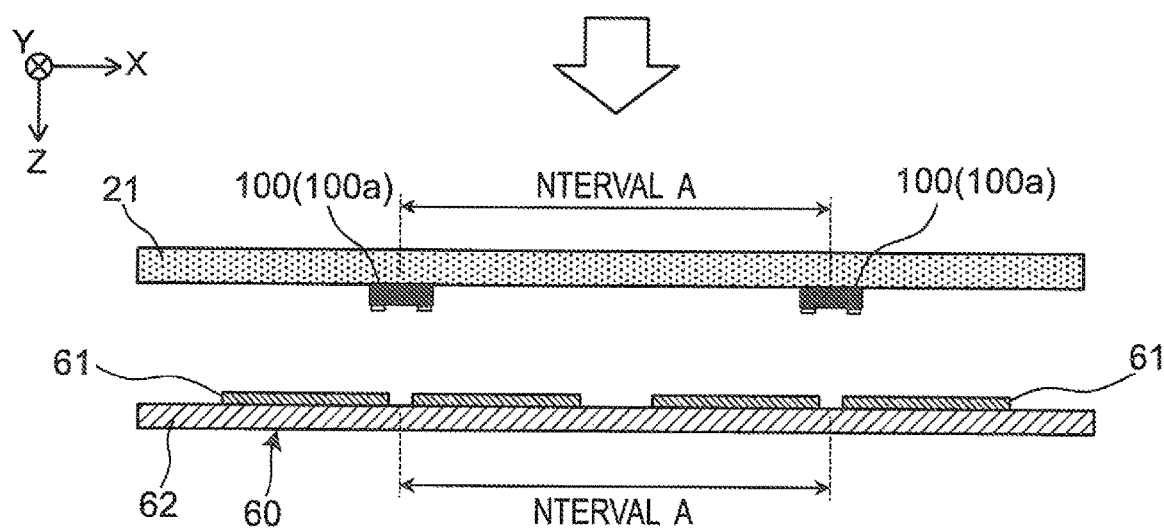
FIG. 7E is a view showing an example of the disposing step of the RFID tag manufacturing method in the first exemplary embodiment.

As shown in FIG. 7E, the holding tool 22 holding the transfer sheet 21 is moved to above the conveying stage 30 by the moving device 26. On the conveying stage 30, the antenna substrate 60 having the plurality of the antenna patterns 61 has been placed. The plurality of the antenna patterns 61 is arranged at the interval A in the X direction and the intervals B in the Y direction (see FIG. 6).

The moving device 26 aligns the RFIC element group 100a with the plurality of the antenna patterns 61 by using a camera, or the like, and moves the holding tool 22 holding the transfer sheet 21 toward the antenna substrate 60. In this case, the plurality of the RFIC elements 100 included in the RFIC element group 100a bonded to the transfer sheet 21 is moved toward the plurality of the antenna patterns 61 of the antenna substrate 60 while maintaining the state of having the interval A in the X direction and the intervals B in the Y direction.

Figure 7F:
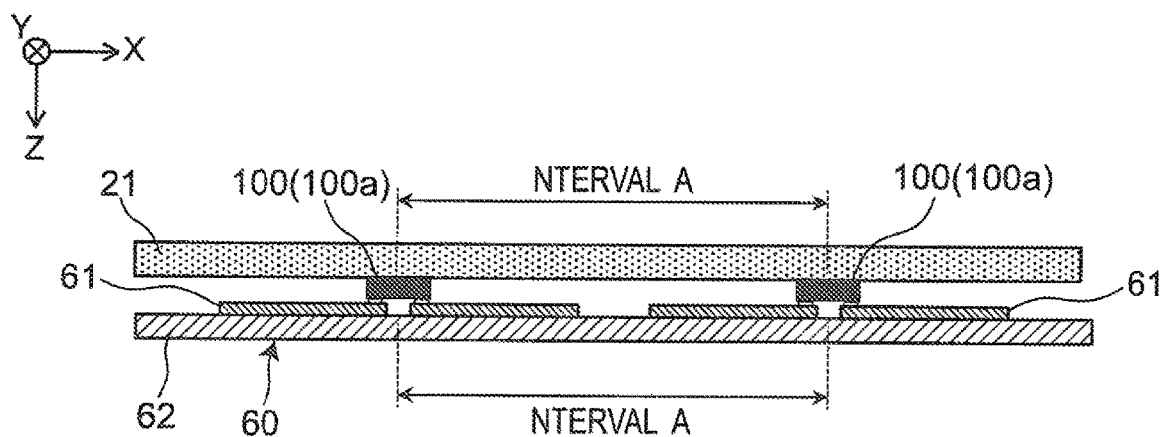
FIG. 7F is a view showing an example of the disposing step of the RFID tag manufacturing method in the first exemplary embodiment.

As a result, as shown in FIG. 7F, the RFIC element group 100a bonded to the transfer sheet 21 is disposed (i.e., transferred) onto the plurality of the antenna patterns 61. Terminals of the RFIC elements 100 of the RFIC element group 100a and terminals of the antenna patterns 61 are respectively bonded by a conductive bonding material such as solder, Ag paste, and anisotropic conductive paste, for example. Subsequently, the holding tool 22 holding the transfer sheet 21 is moved by the moving device 26 in the direction opposite to the antenna substrate 60 to peel off the transfer sheet 21 from the RFIC element group 100a. In the first embodiment, the adhesive force of the adhesive surface of the transfer sheet 21 is preferably smaller than a bonding force of a bonding member (e.g., solder etc.) bonding the terminals of the RFIC element group 100a and the terminals of the antenna patterns 61 so that the transfer sheet 21 can be peeled off from the RFIC element group 100a. Alternatively, the terminals of the RFIC elements 100 and the terminals of the antenna patterns 61 may capacitively be coupled via an insulating adhesive material.

Figure 7G:
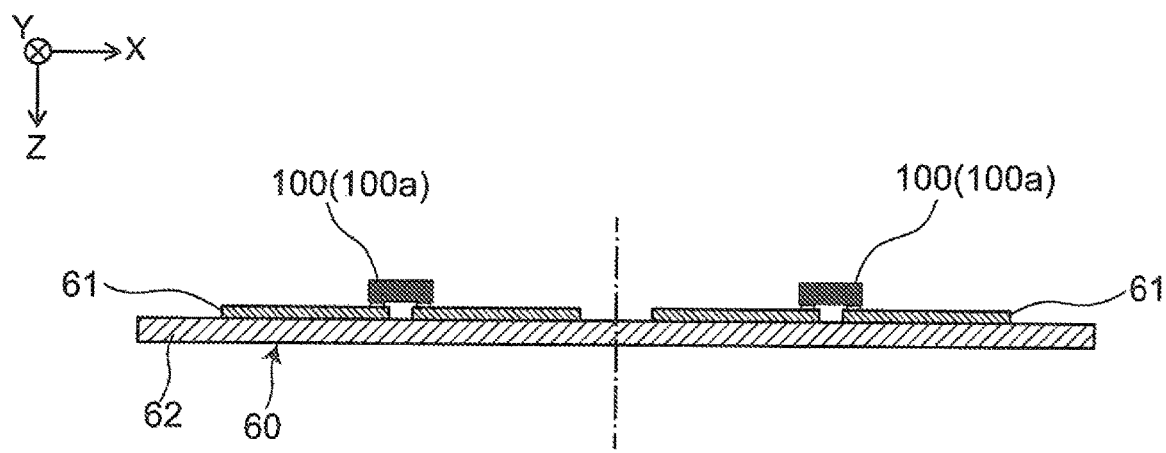
FIG. 7G is a view showing an example of the disposing step of the RFID tag manufacturing method in the first exemplary embodiment.

As shown in FIG. 7G, the antenna substrate 60 having the RFIC elements 100 mounted thereon is singulated into individual pieces by the singulating device (not shown). As a result, RFID tags are manufactured.

Subsequently, in the disposing step ST20, a plurality of the RFIC elements 100 in the second and fifth rows in the X direction in the housing tool 10 is extracted as an RFIC element group 100b and disposed onto a plurality of the antenna patterns 61 of another antenna substrate 60.

FIGS. 8A to 8G are views showing an example of the disposing step ST20 of the manufacturing method in the first embodiment. In FIGS. 8A to 8G, the holding tool 22, the stage 25, the moving device 26, and the conveying stage 30 are not shown for simplification of description.

Figure 8A:
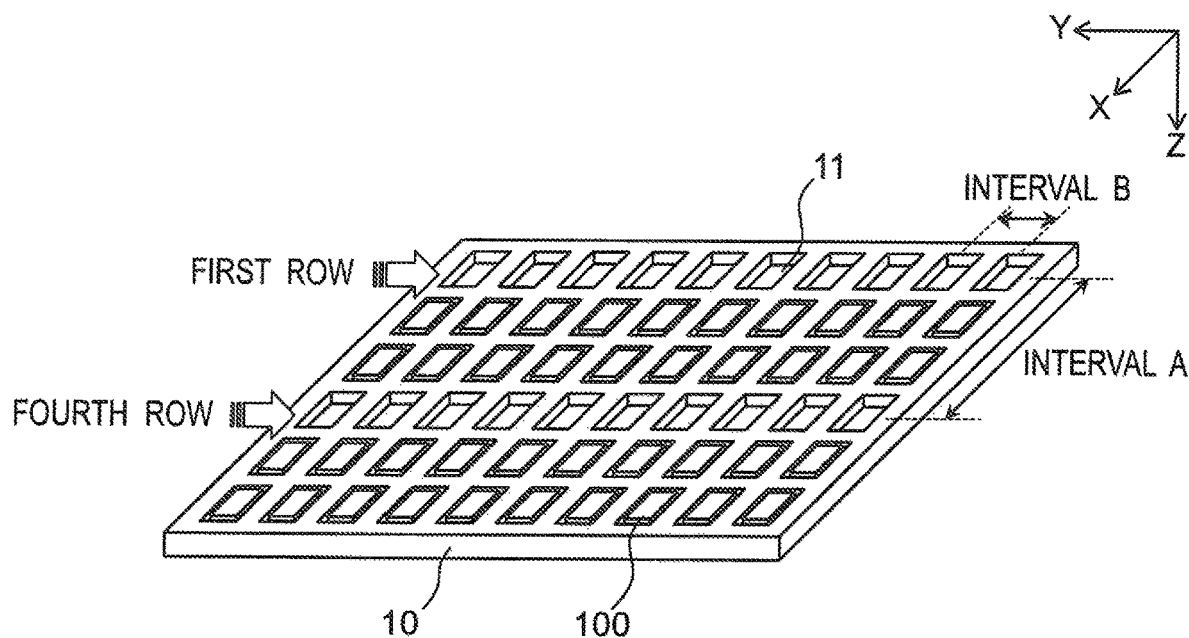
FIG. 8A is a view showing an example of the disposing step of the RFID tag manufacturing method in the first exemplary embodiment.

As shown in FIG. 8A, since the plurality of the RFIC elements 100 in the first and fourth rows in the X direction in the housing tool 10 is extracted as the RFIC element group 100a, a plurality of the housing parts 11 in the first and fourth rows in the X direction is empty. In FIG. 8A, the mask 23 is not shown for facilitating description.

Figure 8B:
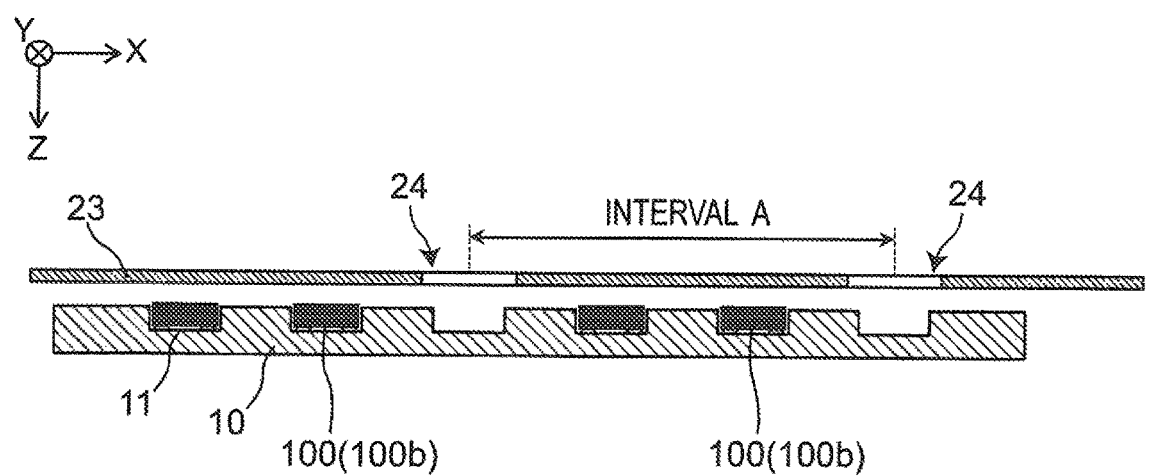
FIG. 8B is a view showing an example of the disposing step of the RFID tag manufacturing method in the first exemplary embodiment.

As shown in FIG. 8B, after the extraction of the RFIC element group 100a from the housing tool 10, the through-holes 24 of the mask 23 are disposed at the empty housing parts 11 in the first and fourth rows in the X direction. The mask 23 is then lifted from the housing tool 10 and fixed.

Figure 8C:
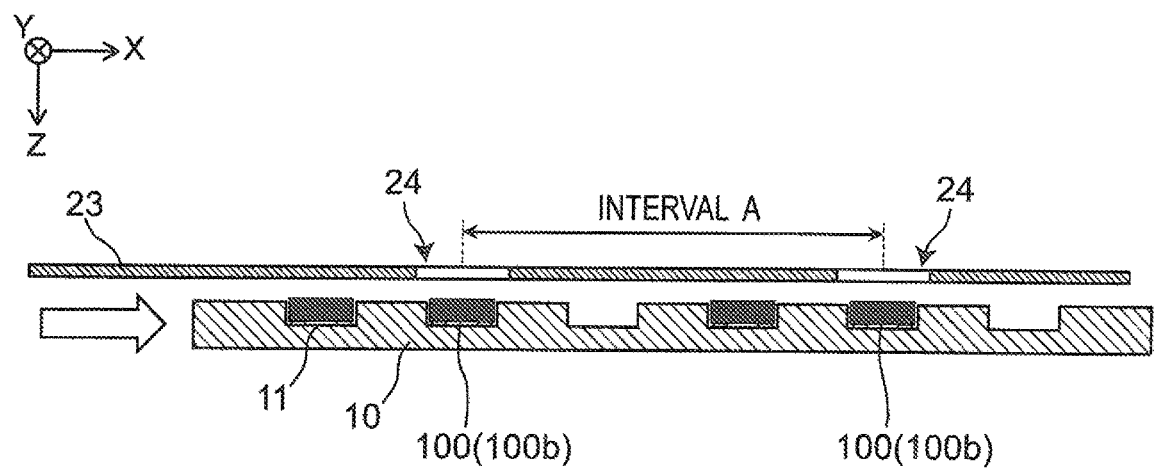
FIG. 8C is a view showing an example of the disposing step of the RFID tag manufacturing method in the first exemplary embodiment.

As shown in FIG. 8C, the housing tool 10 is moved by the stage 25 in the X direction. As a result, the through-holes 24 of the mask 23 are aligned with a plurality of the RFIC elements 100 arranged in the second and fifth rows in the X direction of the housing tool 10 desired to be extracted as the RFIC element group 100b. In the first embodiment, the plurality of the RFIC elements 100 arranged in the second row and the plurality of the RFIC elements 100 arranged in the fifth row in the X direction of the housing tool 10 are arranged at the interval A in the X direction. The plurality of the RFIC elements 100 arranged in the second row and the plurality of the RFIC elements 100 arranged in the fifth row in the X direction of the housing tool 10 are each arranged at the intervals B in the Y direction.

Figure 8D:
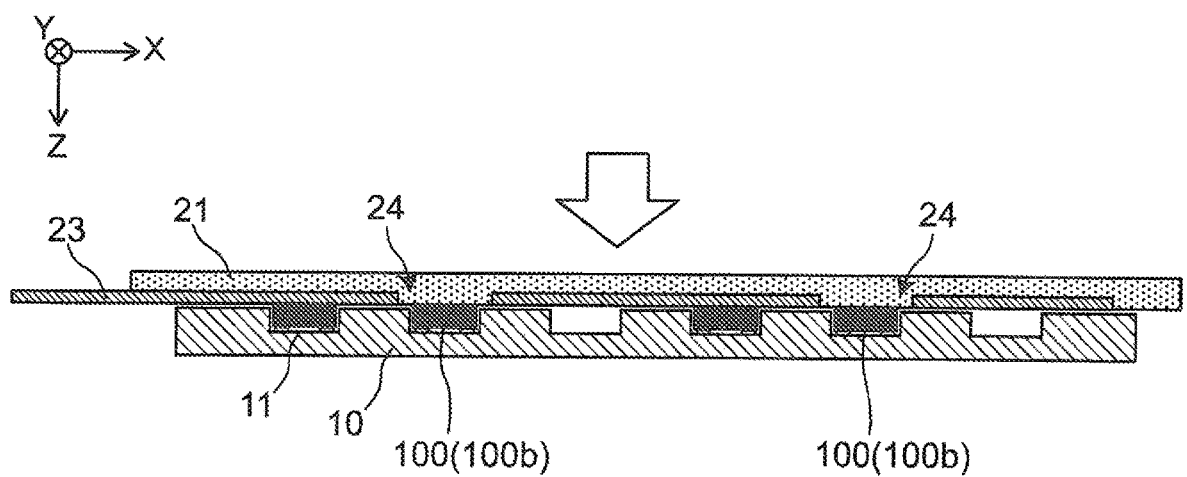
FIG. 8D is a view showing an example of the disposing step of the RFID tag manufacturing method in the first exemplary embodiment.

As shown in FIG. 8D, after the alignment, the mask 23 is lowered onto the housing tool 10. The holding tool 22 holding the transfer sheet 21 is then moved toward the housing tool 10 by the moving device 26, and the adhesive surface of the transfer sheet 21 is pressed against the plurality of the RFIC elements 100 arranged in the second and fifth rows in the X direction of the housing tool 10 through the through-holes 24 of the mask 23. As a result, the adhesive surface of the transfer sheet 21 is bonded to the upper surfaces of the plurality of the RFIC elements 100 arranged in the second and fifth rows in the X direction of the housing tool 10, i.e., the upper surfaces of the RFIC element group 100b.

Figure 8E:
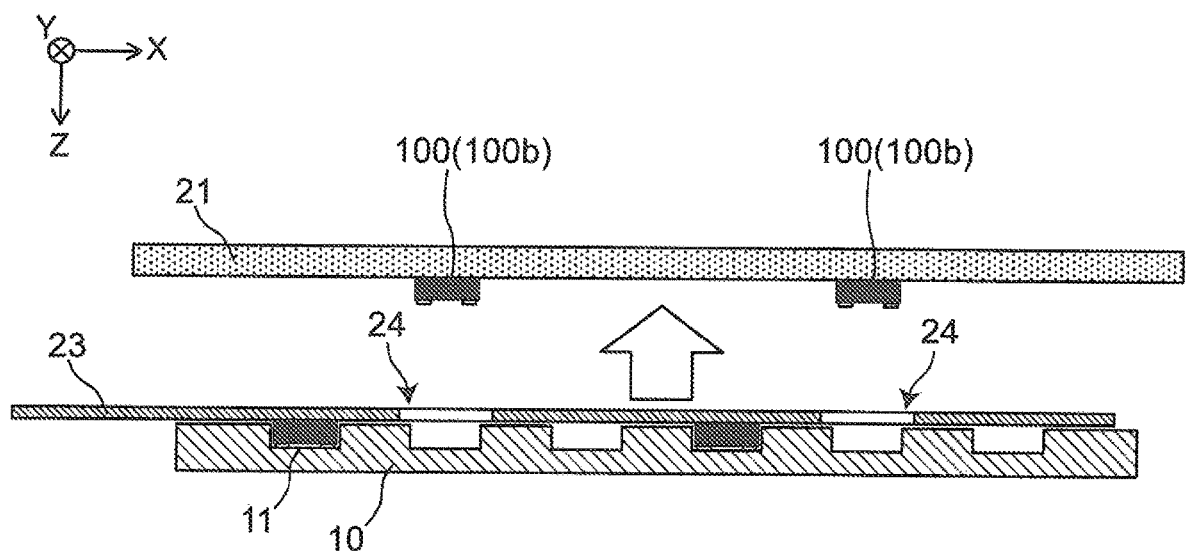
FIG. 8E is a view showing an example of the disposing step of the RFID tag manufacturing method in the first exemplary embodiment.

As shown in FIG. 8E, the holding tool 22 holding the transfer sheet 21 is moved by the moving device 26 in the direction opposite to the housing tool 10 to pull up the transfer sheet having the RFIC element group 100a bonded thereto. As a result, the RFIC element group 100a including the plurality of the RFIC elements 100 arranged at the interval A in the X direction and the intervals B in the Y direction can be extracted from the housing tool 10.

Figure 8F:
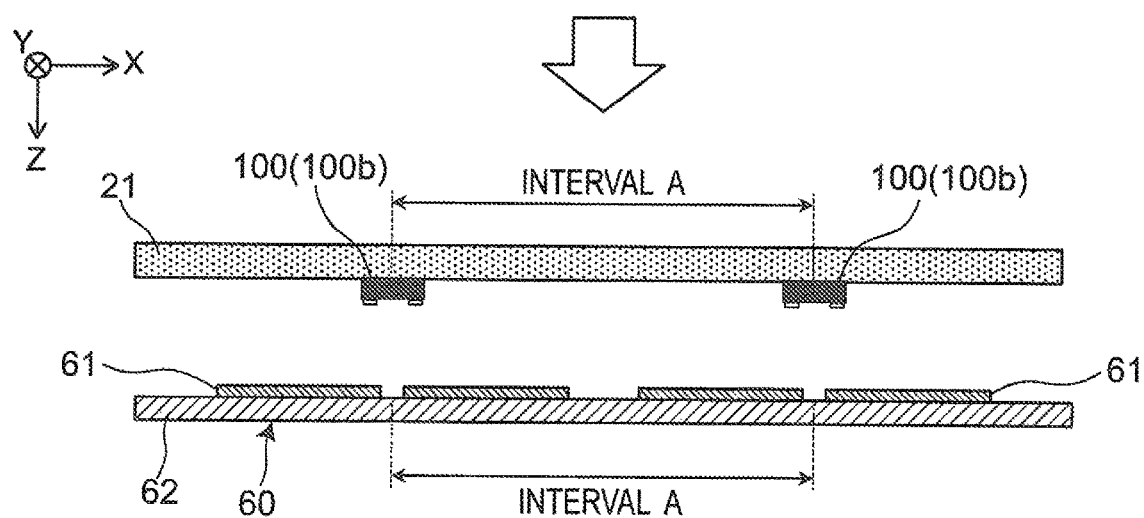
FIG. 8F is a view showing an example of the disposing step of the RFID tag manufacturing method in the first exemplary embodiment.

As shown in FIG. 8F, the holding tool 22 holding the transfer sheet 21 having the RFIC element group 100b bonded thereto is moved to above the conveying stage 30 by the moving device 26. The moving device 26 aligns the RFIC element group 100b with the plurality of the antenna patterns 61 by using a camera etc. and moves the holding tool 22 holding the transfer sheet 21 toward the antenna substrate 60. In this case, the plurality of the RFIC elements 100 included in the RFIC element group 100b bonded to the transfer sheet 21 is moved toward the plurality of the antenna patterns 61 of the antenna substrate 60 while maintaining the state of having the interval A in the X direction and the intervals B in the Y direction.

Figure 8G:
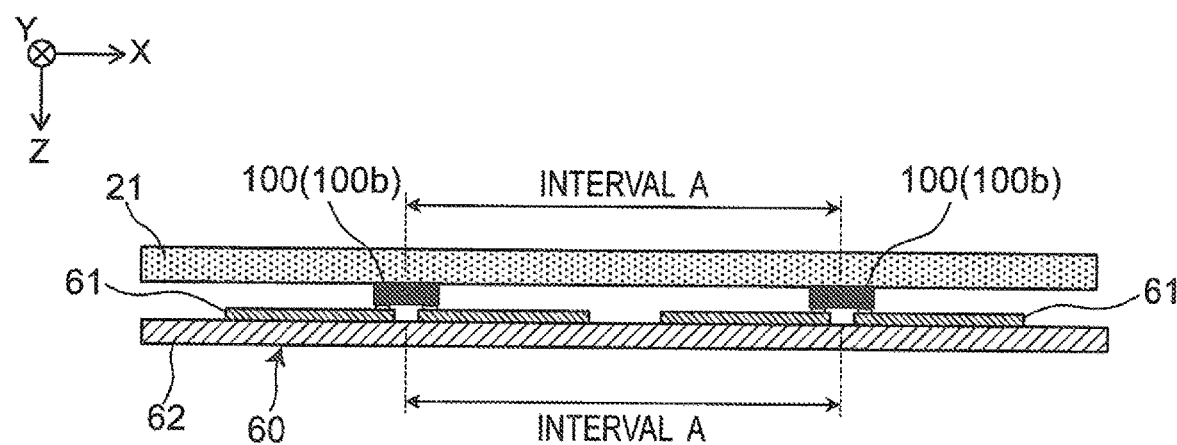
FIG. 8G is a view showing an example of the disposing step of the RFID tag manufacturing method in the first exemplary embodiment.

As a result, as shown in FIG. 8G, the RFIC element group 100b bonded to the transfer sheet 21 is disposed onto the plurality of the antenna patterns 61. After the terminals of the RFIC element group 100b and the terminals of the antenna pattern 61 are then bonded by solder etc., the transfer sheet 21 is peeled off from the RFIC element group 100b.

Figure 8H:
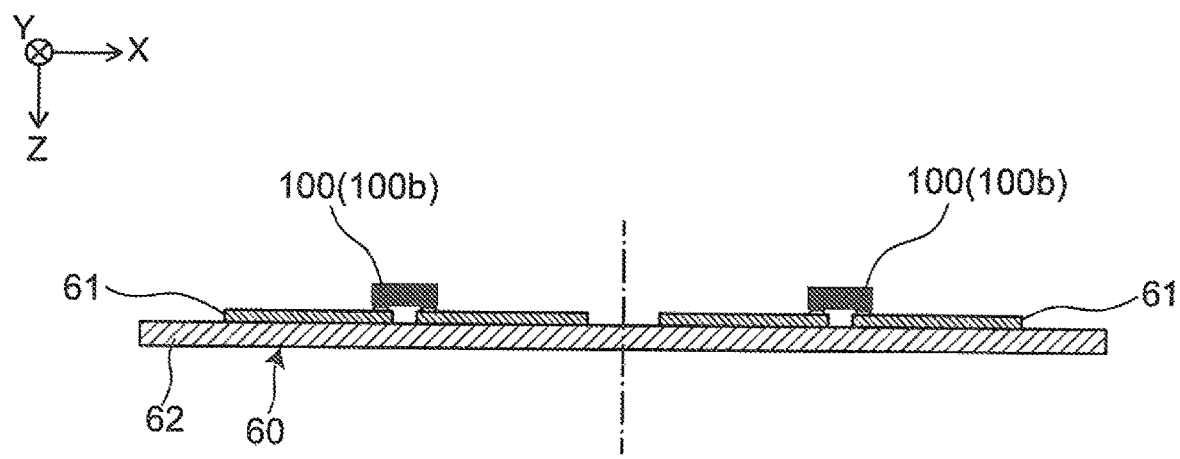
FIG. 8H is a view showing an example of the disposing step of the RFID tag manufacturing method in the first exemplary embodiment.

As shown in FIG. 8H, the antenna substrate 60 having the RFIC elements 100 mounted thereon is singulated into individual pieces by the singulating device (not shown). As a result, RFID tags are manufactured.

Figure 9:
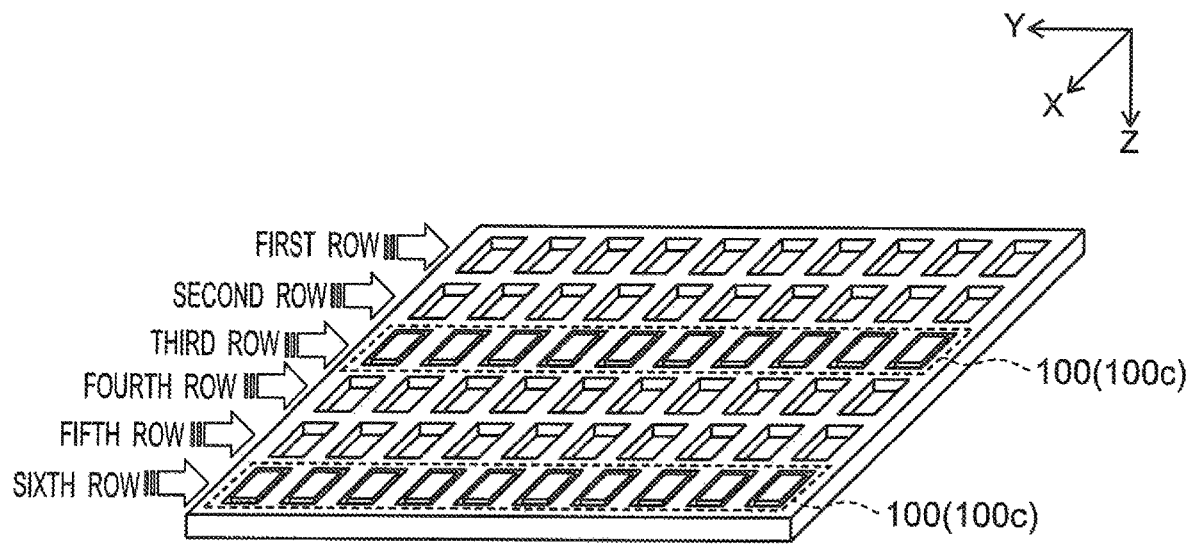
FIG. 9 is a view showing an example of the disposing step of the RFID tag manufacturing method in the first exemplary embodiment.

Subsequently, as shown in FIG. 9, in the disposing step ST20, a plurality of the RFIC elements 100 in the third and sixth rows in the X direction in the housing tool 10 is extracted as an RFIC element group 100c and disposed onto a plurality of the antenna patterns 61 of another antenna substrate 60. This step is the same as the step shown in FIGS. 8A to 8H and therefore will not be described.

While the disposing step ST20 is performed, the arranging step ST10 may be performed with another housing tool 10 to prepare the housing tool 10 having the plurality of the RFIC elements 100 housed in the housing parts 11. As a result, the disposing process ST20 can smoothly be performed by using the other housing tool 10, so that productivity is further increased.

A specific configuration of the RFIC element 100 will be described.

Figure 10:
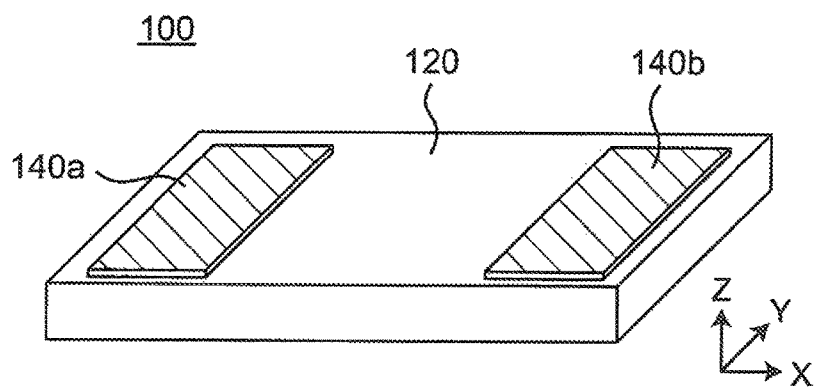
FIG. 10 is a perspective view showing an example of an RFIC element.

FIG. 10 is a perspective view of the RFIC element 100. The RFIC element 100 is an RFIC element corresponding to a communication frequency of, for example, the 900 MHz band, i.e., the UHF band. The RFIC element 100 has a multilayer substrate 120 with a principal surface forming a rectangle. The multilayer substrate 120 has flexibility. For example, the multilayer substrate 120 has a structure of a laminated body acquired by laminating flexible resin insulation layers of polyimide, liquid crystal polymer, etc. The insulation layers made of these materials have the permittivity smaller than that of ceramic base material layers represented by LTCC.

Figure 11:
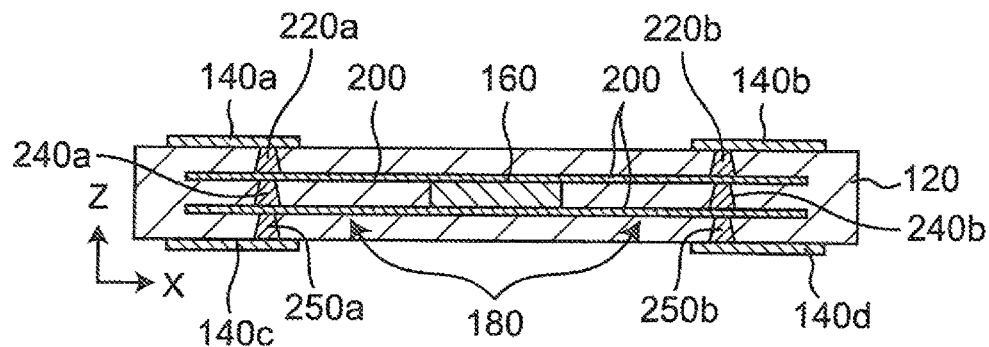
FIG. 11 is a transverse cross-sectional view of the RFIC element shown in FIG. 10.
Figure 12A:
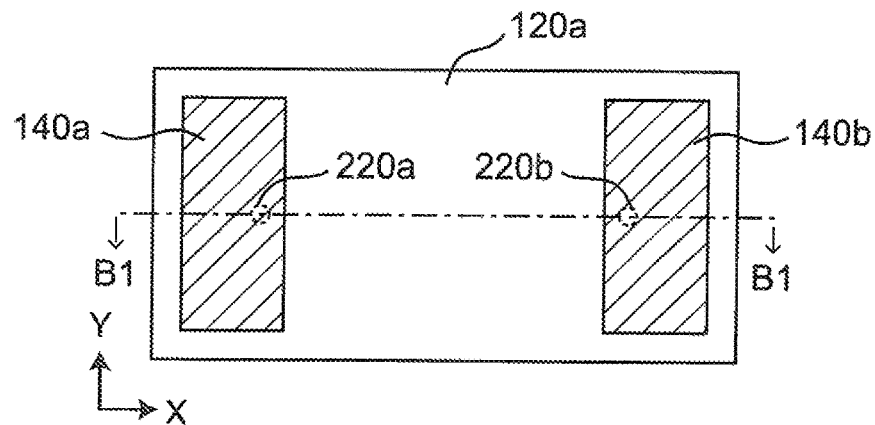
FIG. 12A is a plane view showing an upper insulation layer of a multilayer substrate forming the RFIC element shown in FIG. 10 viewed from directly above.
Figure 12B:
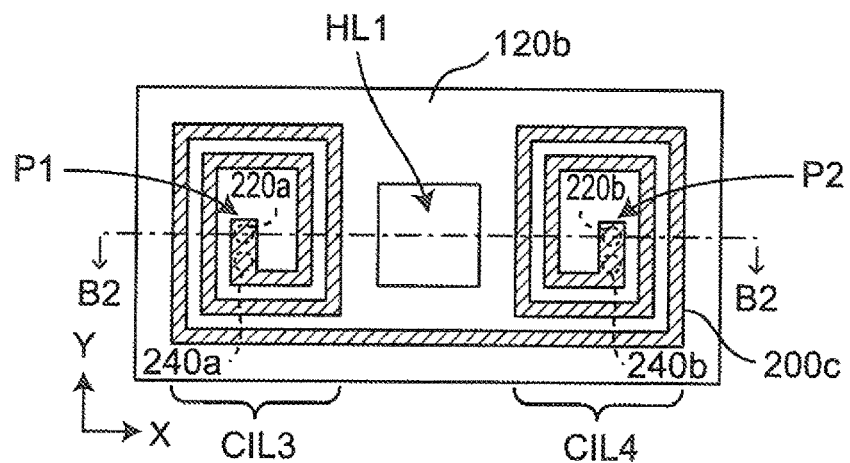
FIG. 12B is a plane view showing an intermediate insulation layer of the multilayer substrate forming the RFIC element shown in FIG. 10 viewed from directly above.
Figure 12C:
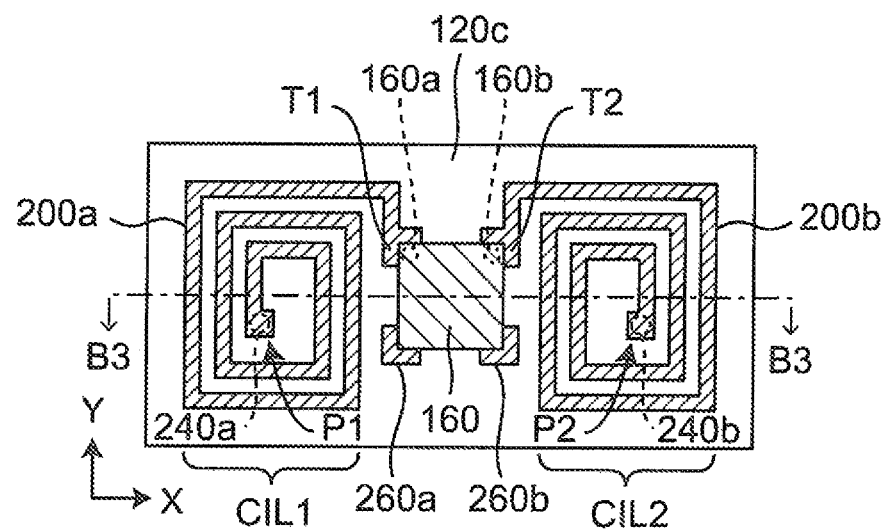
FIG. 12C is a plane view showing a lower insulation layer of the multilayer substrate forming the RFIC element shown in FIG. 10 viewed from directly above.
Figure 12D:
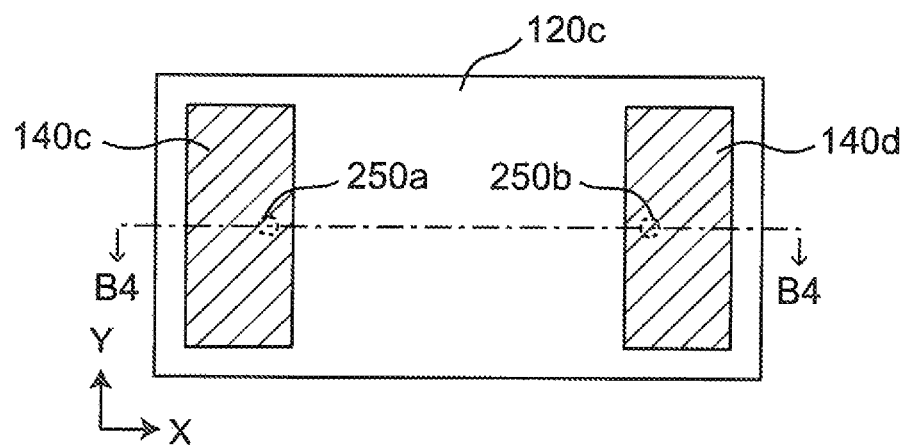
FIG. 12D is a plane view showing the lower insulation layer of the multilayer substrate forming the RFIC element shown in FIG. 10 viewed from directly below.
Figure 13A:
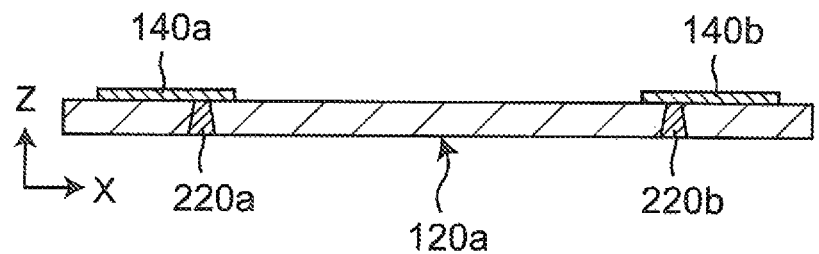
FIG. 13A is a cross-sectional view taken along a line B1-B1 of the insulation layer shown in FIG. 12A.
Figure 13B:
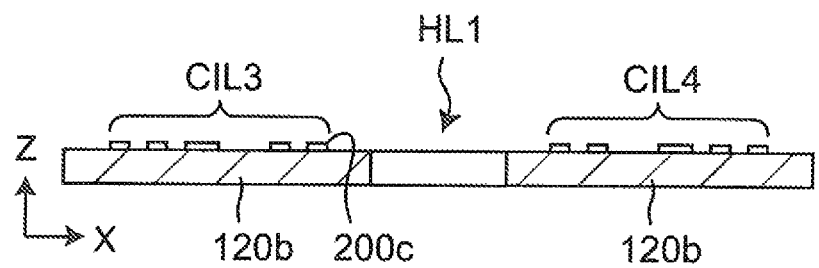
FIG. 13B is a cross-sectional view taken along a line B2-B2 of the insulation layer shown in FIG. 12B.
Figure 13C:
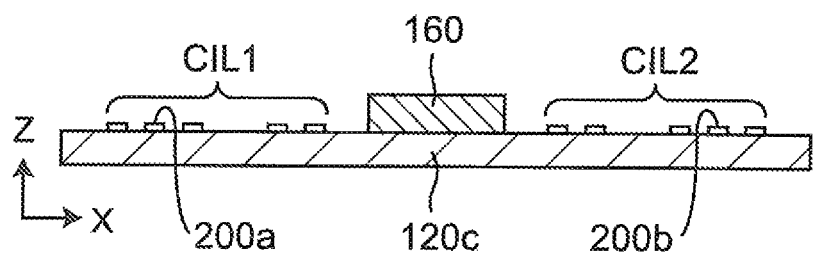
FIG. 13C is a cross-sectional view taken along a line B3-B3 of the insulation layer shown in FIG. 12C.
Figure 13D:
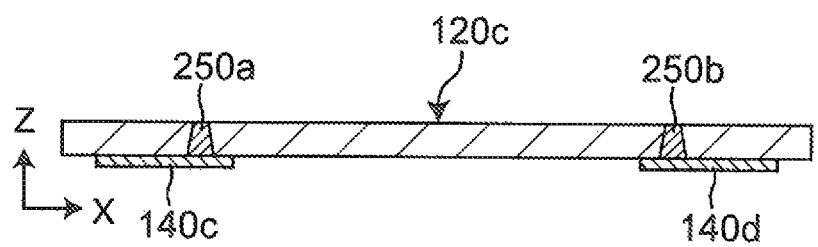
FIG. 13D is a cross-sectional view taken along a line B4-B4 of the insulation layer shown in FIG. 12D.

FIG. 11 is a transverse cross-sectional view of the RFIC element 100 shown in FIG. 10. FIG. 12A is a plane view showing an upper insulation layer of the multilayer substrate 120 viewed from directly above. FIG. 12B is a plane view showing an intermediate insulation layer of the multilayer substrate 120 viewed from directly above. FIG. 12C is a plane view showing a lower insulation layer of the multilayer substrate 120 viewed from directly above. FIG. 12D is a plane view showing the lower insulation layer of the multilayer substrate 120 viewed from directly below. FIG. 13A is a cross-sectional view taken along a line B1-B1 of the insulation layer shown in FIG. 12A. FIG. 13B is a cross-sectional view taken along a line B2-B2 of the insulation layer shown in FIG. 12B. FIG. 13C is a cross-sectional view taken along a line B3-B3 of the insulation layer shown in FIG. 12C. FIG. 13D is a cross-sectional view taken along a line B4-B4 of the insulation layer shown in FIG. 12D.

As shown in FIG. 11, an RFIC chip 160 and a power feeding circuit 180 are built into the multilayer substrate 120. A first terminal electrode 140a and a second terminal electrode 140b are formed on one principal surface of the multilayer substrate 120. A third terminal electrode 140c and a fourth terminal electrode 140d are formed on the other principal surface of the multilayer substrate 120.

The RFIC chip 160 has a structure in which various elements are built into a hard semiconductor substrate made of a semiconductor such as silicon. Both principal surfaces of the RFIC chip 160 are formed into a square. As shown in FIG. 12C, a first input/output terminal 160a and a second input/output terminal 160b are formed on the other principal surface of the RFIC chip 160. The RFIC chip 160 is located at the center in each of the X, Y, and Z directions inside the multilayer substrate 120 in a posture in which the sides of the square extends along the X direction or the Y direction and the one principal surface and the other principal surface face the positive side and the negative side, respectively, in the Z-axis direction.

The power feeding circuit 180 is made up of a coil conductor 200 and interlayer connection conductors 240a, 240b. The coil conductor 200 is made up of coil patterns 200a to 200c shown in FIG. 12B or 12C. A portion of the coil pattern 200a is made up of a first coil part CIL1. A portion of the coil pattern 200b is made up of a second coil part CIL2. Portions of the coil pattern 200c are made up of a third coil part CIL3 and a fourth coil part CIL4.

The first coil part CIL1, the third coil part CIL3, and the interlayer connection conductor 240a are arranged in the Z direction at positions on the negative side in the X direction. The second coil part CIL2, the fourth coil part CIL4, and the interlayer connection conductor 240b are arranged in the Z direction at positions on the positive side in the X direction.

When the multilayer substrate 120 is viewed in the Z direction, the RFIC chip 160 is located between the first coil part CIL1 and the second coil part CIL2. When the multilayer substrate 120 is viewed in the Y direction, the RFIC chip 160 is located between the third coil part CIL3 and the fourth coil part CIL4.

The first terminal electrode 140a and the third terminal electrode 140c are disposed at a position on the negative side in the X direction. The second terminal electrode 140b and the fourth terminal electrode 140d are disposed at a position on the positive side in the X direction. The first terminal electrode 140a, the second terminal electrode 140b, the third terminal electrode 140c, and the fourth terminal electrode 140d are all formed of flexible copper foil into a strip shape. The first terminal electrode 140a, the second terminal electrode 140b, the third terminal electrode 140c, and the fourth terminal electrode 140d have the respective principal surface sizes identical to each other. The short sides of the first terminal electrode 140a, the second terminal electrode 140b, the third terminal electrode 140c, and the fourth terminal electrode 140d extend in the X direction. The long sides of the first terminal electrode 140a, the second terminal electrode 140b, the third terminal electrode 140c, and the fourth terminal electrode 140d extend in the Y direction.

Therefore, when the multilayer substrate 120 is viewed in the Y direction, the RFIC chip 160 is interposed between a portion of the power feeding circuit 180 and another portion of the power feeding circuit 180. When the multilayer substrate 120 is viewed in the X direction, the RFIC chip 160 overlaps with the power feeding circuit 180. In a planar view of the multilayer substrate 120, the power feeding circuit 180 partially overlaps with each of the first terminal electrode 140a, the second terminal electrode 140b, the third terminal electrode 140c, and the fourth terminal electrode 140d.

As shown in FIGS. 12A to 12D, the multilayer substrate 120 is made up of three laminated sheet-shaped insulation layers 120a to 120c. The insulation layer 120a is located at an upper position, the insulation layer 120b is located at an intermediate position, and the insulation layer 120c is located at a lower position.

The first terminal electrode 140a and the second terminal electrode 140b are formed on one principal surface of the insulation layer 120a. At the center position of one principal surface of the insulation layer 120b, a rectangular through-hole HL1 is formed, reaching the other principal surface. The through-hole HL1 is formed into a size containing the RFIC chip 160. The coil pattern 200c extending in a belt shape is formed around the through-hole HL1 on the one principal surface of the insulation layer 120b. The coil pattern 200c is made of copper foil having flexibility.

One end part of the coil pattern 200c is disposed at a position overlapping with the first terminal electrode 140a in the planar view and is connected to the first terminal electrode 140a by an interlayer connection conductor 220a extending in the Z direction. The other end part of the coil pattern 200c is disposed at a position overlapping with the second terminal electrode 140b in the planar view and is connected to the second terminal electrode 140b by an interlayer connection conductor 220b extending in the Z direction. The interlayer connection conductors 220a, 220b are made up of hard metal bulks containing Sn as a main component.

Assuming that the one end part of the coil pattern 200c is a starting point, the coil pattern 200c goes around the one end part twice in the counterclockwise direction, extends to near the end part of the negative side in the Y direction, and then extends into the positive side in the X direction. The coil pattern 200c bends near the end part of the positive side in the X direction toward the positive side in the Y direction and goes around the other end part twice in the counterclockwise direction before reaching the other end part.

The coil patterns 200a, 200b extending in a belt shape are formed on one principal surface of the insulation layer 120c. The coil patterns 200a, 200b are made of copper foil having flexibility. In a planar view of the insulation layers 120b, 120c, one end part of the coil pattern 200a is disposed at a position somewhat on the negative side in the Y direction as compared to the one end part of the coil pattern 200c, and the other end part of the coil pattern 200a (=a first coil end T1) is disposed at a position overlapping with a corner part on the negative side in the X direction and the positive side in the Y direction out of the four corner parts of the rectangular through-hole HL1.

One end part of the coil pattern 200b is disposed at a position somewhat on the negative side in the Y-axis direction as compared to the other end part of the coil pattern 200c. The other end part of the coil pattern 200b (=a second coil end T2) is disposed at a position overlapping with a corner part on the positive side in the X-axis direction and the positive side in the Y-axis direction out of the four corner parts of the rectangular through-hole HL1. Both the first coil end T1 and the second coil end T2 are formed into a rectangle in the planar view of the insulation layer 120c.

Assuming that the one end part of the coil pattern 200a is a starting point, the coil pattern 200a goes around the one end part 2.5 times in the clockwise direction and subsequently bends toward the negative side in the Y direction to reach the other end part. Similarly, assuming that the one end part of the coil pattern 200b is a starting point, the coil pattern 200b goes around the one end part 2.5 times in the counterclockwise direction and subsequently bends toward the negative side in the Y direction to reach the other end part. The one end part of the coil pattern 200a is connected to the one end part of the coil pattern 200c by the interlayer connection conductor 240a extending in the Z direction. The one end part of the coil pattern 200b is connected to the other end part of the coil pattern 200c by the interlayer connection conductor 240b extending in the Z direction. The interlayer connection conductors 240a, 240b are made up of hard metal bulks containing Sn as a main component.

The third terminal electrode 140c and the fourth terminal electrode 140d are formed on the other principal surface of the insulation layer 120c. The third terminal electrode 140c is connected to the one end part of the coil pattern 200a by an interlayer connection conductor 250a extending in the Z direction. The fourth terminal electrode 140d is connected to the one end part of the coil pattern 200b by an interlayer connection conductor 250b extending in the Z direction. The interlayer connection conductors 250a, 250b are made up of hard metal bulks containing Sn as a main component.

In the planar view of the insulation layers 120b, 120c, a section of the coil pattern 200a overlaps with a section of the coil pattern 200c, and a section of the coil pattern 200b overlaps with another section of the coil pattern 200c. Between the overlapping sections of the coil patterns 200a, 200c, the section of the coil pattern 200a is defined as a "first coil part CIL1" and the section of the coil pattern 200c is defined as a "third coil part CIL3". Between the overlapping sections of the coil patterns 200b, 200c, the section of the coil pattern 200b is defined as a "second coil part CIL2" and the section of the coil pattern 200c is defined as a "fourth coil part CIL4". The position of the one end part of the coil pattern 200a or the one end part of the coil pattern 200c is defined as a "first position P1" and the position of the one end part of the coil pattern 200b or the other end part of the coil pattern 200c is defined as a "second position P2".

Rectangular dummy conductors 260a, 260b are formed on the one principal surface of the insulation layer 120c. The dummy conductors 260a, 260b are made of copper foil having flexibility. In the planar view of the insulation layers 120b, 120c, the dummy conductors 260a, 260b are disposed to overlap with two respective corner parts arranged in the X-axis direction on the negative side in the Y-axis direction out of the four corner parts of the rectangle through-hole HL1.

The RFIC chip 160 is mounted on the insulation layer 120c such that the four corner parts of the other principal surface respectively face the first coil end T1, the second coil end T2, and the dummy conductors 260a, 260b. The first input/output terminal 160a is disposed on the other principal surface of the RFIC chip 160 to overlap with the first coil end T1 in the planar view. Similarly, the second input/output terminal 160b is disposed on the other principal surface of the RFIC chip 160 to overlap with the second coil end T2 in the planar view.

As a result, the RFIC chip 160 is connected to the first coil end T1 by the first input/output terminal 160a and is connected to the second coil end T2 by the second input/output terminal 160b.

The thickness of the insulation layers 120a to 120c is 10 μm or more and 100 μm or less. Therefore, the RFIC chip 160 and the power feeding circuit 180 built into the multi-layer substrate 120 can be seen through on the outside. Therefore, the connection state (presence of a broken wire) of the RFIC chip 160 and the power feeding circuit 180 can easily be confirmed.

Figure 14:
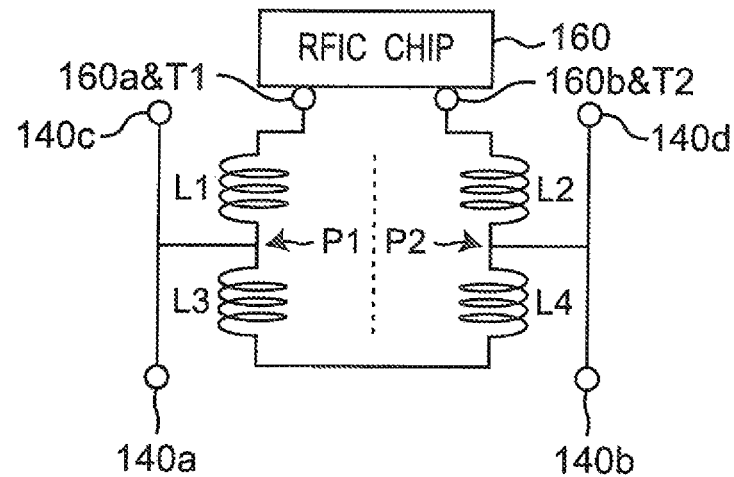
FIG. 14 is a diagram showing an equivalent circuit of the RFIC element shown in FIG. 10.

FIG. 14 is a diagram of an equivalent circuit of the RFIC element 100 configured as described above. In FIG. 14, an inductor L1 corresponds to the first coil part CIL1. An inductor L2 corresponds to the second coil part CIL2. An inductor L3 corresponds to the third coil part CIL3. An inductor L4 corresponds to the fourth coil part CIL4. The characteristics of impedance matching by the power feeding circuit 180 are specified by the values of the inductors L1 to L4.

One end part of the inductor L1 is connected to the first input/output terminal 160a disposed on the RFIC chip 160. One end part of the inductor L2 is connected to the second input/output terminal 160b disposed on the RFIC chip 160. The other end part of the inductor L1 is connected to one end part of the inductor L3. The other end part of the inductor L2 is connected to one end part of the inductor L4. The other end part of the inductor L3 is connected to the other end part of the inductor L4. The first terminal electrode 140a and the third terminal electrode 140c are connected to a connection point between the inductors L1, L3. The second terminal electrode 140b and the fourth terminal electrode 140d are connected to a connection point between the inductors L2, L4.

Figure 15:
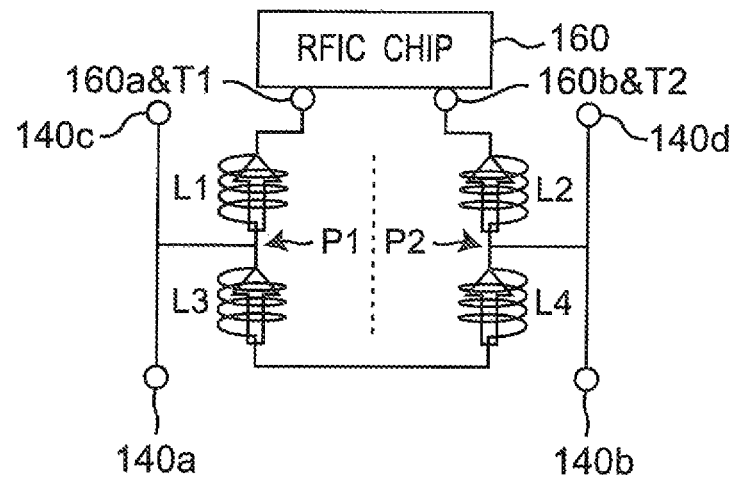
FIG. 15 is a diagram showing an example of a state of a magnetic field occurring on the equivalent circuit shown in FIG. 14.

As can be seen from the equivalent circuit shown in FIG. 15, the first coil part CIL1, the second coil part CIL2, the third coil part CIL3, and the fourth coil part CIL4 are wound to form magnetic fields in phase and are connected in series to each other. Therefore, the magnetic fields are generated toward a direction indicted by arrows of FIG. 15 at a certain time point. On the other hand, the magnetic fields are generated toward a direction opposite to the direction indicted by the arrows of FIG. 15 at another time point.

As can be seen from FIGS. 12B and 12C, the first coil part CIL1 and the third coil part CIL3 have substantially the same loop shape and the same first winding axis. Similarly, the second coil part CIL2 and the fourth coil part CIL4 have substantially the same loop shape and the same second winding axis. The first winding axis and the second winding axis are disposed at positions where the RFIC chip 160 is interposed therebetween.

Therefore, the first coil part CIL1 and the third coil part CIL3 are magnetically and capacitively coupled. Similarly, the second coil part CIL2 and the fourth coil part CIL4 are magnetically and capacitively coupled.

As can be seen from the description, the RFIC chip 160 has the first input/output terminal 160a and the second input/output terminal 160b and is built into the multilayer substrate 120. The power feeding circuit 180 includes the coil patterns 200a to 200c and is built into the multilayer substrate 120. Among them, the coil pattern 200a has the other end part (=the first coil end T1) connected to the first input/output terminal 160a, and the coil pattern 200b has the other end part (=the second coil end T2) connected to the second input/output terminal 160b. The first terminal electrode 140a and the second terminal electrode 140b are disposed on the one principal surface of the multilayer substrate 120. The third terminal electrode 140c and the fourth terminal electrode 140d are disposed on the other principal surface of the multilayer substrate 120. The first terminal electrode 140a and the third terminal electrode 140c are connected to the one end part of the coil pattern 200a (=the first position P1). The second terminal electrode 140b and the fourth terminal electrode 140d are both connected to the one end part of the coil pattern 200b (=the second position P2).

The first coil part CIL1 is present in a section from the first coil end T1 to the first position P1 and has the first winding axis in the direction intersecting with the one principal surface of the multilayer substrate 120. The second coil part CIL2 is present in a section from the second coil end T2 to the second position P2 and has the second winding axis in the direction intersecting with the one principal surface of the multilayer substrate 120. The third coil part CIL3 is disposed to overlap with the first coil part CIL1 in the planar view. The fourth coil part CIL4 is disposed to overlap with the second coil part CIL2 in the planar view. The first coil part CIL1/the third coil part CIL3 and the second coil part CIL2/the fourth coil part CIL4 are disposed at positions where the RFIC chip 160 is interposed therebetween. The multilayer substrate 120 has the power feeding circuit 180 for impedance matching between the antenna element 12 and the RFIC chip 160 as well as the RFIC chip 160 built-in.

The RFIC chip 160 is made up of the semiconductor substrate. Therefore, the RFIC chip 160 acts as a ground or a shield for the first coil part CIL1, the second coil part CIL2, the third coil part CIL3, and the fourth coil part CIL4. Consequently, the first coil part CIL1 and the second coil part CIL2 as well as the third coil part CIL3 and the fourth coil part CIL4 are hardly magnetically or capacitively coupled to each other. This enables a reduction in the risk of narrowing the passband of communication signals.

[Effects]

According to the RFID tag manufacturing method of the first embodiment, the following effects can be produced.

According to the RFID tag manufacturing method of the first embodiment, a plurality of the RFIC elements 100 can collectively be disposed on a plurality of the antenna patterns 61 of the antenna substrate 60. Therefore, according to the RFID tag manufacturing method of the first embodiment, a plurality of RFID tags can be manufactured in a short time, so that the productivity can be increased.

According to the RFID tag manufacturing method of the first embodiment, in the disposing step ST20, the RFIC element group 100a having the second arrangement density corresponding to the arrangement density of the plurality of the antenna patterns 61 arranged on the antenna substrate 60 is extracted. According to the RFID tag manufacturing method of the first embodiment, the RFIC element group 100a is disposed on the plurality of the antenna patterns 61 of the antenna substrate 60 while maintaining the second arrangement density. More specifically, in the disposing step ST20, the plurality of the RFIC elements 100 arranged at the same intervals as the intervals (the interval A in the X direction and the intervals B in the Y direction) of the plurality of the antenna patterns 61 of the antenna substrate 60 is extracted from the housing tool 10 as the RFIC element group 100a. The RFIC element group 100a is then disposed on the plurality of the antenna patterns 61 of the antenna substrate 60 while maintaining the intervals. Therefore, the RFID tag manufacturing method of the first embodiment can improve the attachment position accuracy of the RFIC elements 100 to the antenna pattern 61. In the first embodiment, "the plurality of the RFIC elements 100 arranged at the same intervals as the intervals (the interval A in the X direction and the intervals B in the Y direction) of the plurality of the antenna patterns 61 of the antenna substrate 60" may include an error of approximately 0.5 mm, for example.

The manufacturing device 1 of the first embodiment includes the mask 23 having the plurality of the through-holes 24 formed at an arrangement density corresponding to the second arrangement density. In the RFID tag manufacturing method of the first embodiment, the RFIC element group 100a is extracted from the housing tool 10 by using the mask 23 and the transfer sheet 21. Specifically, in the RFID tag manufacturing method according to the first embodiment, the RFIC element group 100a is extracted by bringing the transfer sheet 21 into contact with the RFIC elements 100 arranged in the housing tool 10 via the through-holes 24 of the mask 23. As a result, the RFIC element group 100a can easily be extracted from the housing tool 10, so that the productivity can further be increased.

The RFID tag manufacturing device 1 of the first embodiment has the same effects as the RFID tag manufacturing method of the first embodiment.

In the example described in the first embodiment, the housing tool 10 has the housing parts 11 at equal intervals in six rows in the X direction and ten lines in the Y direction in the planar view; however, the present invention is not limited thereto. The number and intervals of the housing parts 11 of the housing tool 10 may be changed depending on the number and intervals of the antenna patterns 61 of the antenna substrate 60 etc. The housing parts 11 of the housing tool 10 may not be arranged at regular intervals. For example, the number of the multiple housing parts 11 of the housing tool 10 for arranging the plurality of the RFIC elements 100 may be 2m or more in the X direction and n or more in the Y direction in a planar view. It is noted that m is a natural number of 2 or more and that n is a natural number of 1 or more.

In the example described in the first embodiment, the plurality of the antenna patterns 61 of the antenna substrate 60 is arranged at the interval A in the X direction and at the intervals B in the Y direction, while the intervals of the plurality of the housing parts 11 of the housing tool 10 are formed as intervals A/3 in the X direction and the intervals B in the Y direction in a planar view; however, the present invention is not limited thereto. The intervals of the plurality of the housing parts 11 of the housing tool 10 may be an interval A/m in the X direction and an interval B/n in the Y direction in a planar view. It is noted that m is a natural number of 2 or more and that n is a natural number of 1 or more.

In the example described in the first embodiment, the plurality of the housing parts 11 of the housing tool 10 is formed into a matrix shape in the X direction and the Y direction orthogonal to the X direction in a planar view; however, the present invention is not limited thereto. For example, the plurality of the housing parts 11 may be formed in the X direction and a direction intersecting with the X direction in a planar view. In this case, the plurality of the antenna patterns 61 of the antenna substrate 60 is arranged in the X direction and the direction intersecting with the X direction in a planar view.

In the example described above, the housing parts 11 of the housing tool 10 are rectangular recesses in a planar view; however, the present invention is not limited thereto. The shape of the housing parts 11 may be any shape configured to house and position the RFIC elements 100 one by one. For example, the shape of the housing parts 11 may be an ellipse etc. The housing parts 11 may have a taper expanding toward an opening. As a result, in the arranging step ST10, the RFIC element 100 is more easily housed in the housing parts 11.

In the example described in the first embodiment, the plurality of the RFIC elements 100 arranged in the first and fourth rows in the X direction of the housing tool 10 are extracted as the RFIC element group 100a in the disposing step ST20; however, the present invention is not limited thereto. In the disposing step ST20, a plurality of the RFIC elements 100 in S-th and (S+m)-th rows in the X direction of the housing tool 10 may be extracted as the RFIC element group 100a. It is noted that S is a natural number of 1 or more and that m is a natural number of 2 or more. For example, in the disposing step ST20, a plurality of the RFIC elements 100 arranged in the first and third rows in the X direction of the housing tool 10 may be extracted as the RFIC element group 100a.

In the example described above, in the disposing step ST20, the plurality of the RFIC elements 100 arranged in the first and fourth rows in the X direction of the housing tool 10 are extracted as the RFIC element group 100a, and the plurality of the RFIC elements 100 arranged in the second and fifth rows in the X direction of the housing tool 10 are then extracted as the RFIC element group 100b; however, the present invention is not limited to this example. In the disposing step ST20, the RFIC element group 100a extracted from the housing tool 10 may include a plurality of the RFIC elements 100 arranged in the X direction at an interval that is m or more times as large as the interval of the plurality of the RFIC elements 100 arranged in the X direction in the housing tool 10, and the RFIC element group 100a may be disposed on the plurality of the antenna patterns 61 of the antenna substrate 60 while maintaining the interval. It is noted that m is a natural number of 2 or more. The RFIC element group 100b extracted from the housing tool 10 for the second time or later may be extracted from rows different from the rows of the arranged RFIC elements 100 in which the previously extracted RFIC element group 100a was housed.

In the example described in the first embodiment, the RFIC element group 100a is extracted from the housing tool 10 by using the transfer sheet 21 and the mask 23 in the disposing step ST20; however, the present invention is not limited thereto. For example, in the disposing step ST20, the RFIC element group 100a may be extracted without using the mask 23. In this case, an adhesive member may partially be disposed on a surface of the transfer sheet 21 on the side brought into contact with the RFIC elements 100. For example, a plurality of adhesive members may be disposed at an arrangement density corresponding to the second arrangement density on the surface of the transfer sheet 21 on the side brought into contact with the RFIC elements 100. Specifically, the adhesive members may be disposed on the surface of the transfer sheet 21 brought into contact with the RFIC element 100 side at the same intervals as the intervals A, B of the plurality of the antenna patterns 61 of the antenna substrate 60. As a result, the RFIC element group 100a can be extracted without using the mask 23.

In the disposing step ST20, a plurality of suction nozzles may be used instead of the transfer sheet 21 to extract and dispose the RFIC element group 100a. As a result, the RFIC element group 100a can easily be disposed on the plurality of the antenna patterns 61 by the plurality of suction nozzles, so that the productivity can further be increased.

In the disposing step ST20, the RFIC element group 100a may be extracted from the housing tool 10 by using a magnetic coupling instead of the transfer sheet 21 and disposed on the plurality of the antenna patterns 61 of the antenna substrate 60. In this case, the RFIC element 100 must be provided with a magnetic material. As a result, the RFIC element group 100a is easily extracted and disposed.

In the example described in the first embodiment, the transfer sheet 21 is peeled off after disposing the RFIC element group 100a on the plurality of the antenna patterns 61 of the antenna substrate 60 in the disposing step ST20; however, the present invention is not limited thereto. In the disposing step ST20, the transfer sheet 21 may be transferred to the antenna substrate 60 without being peeled off, and the transfer sheet 21 may be used as a protective cover for the RFID tags. In other words, in the disposing step ST20, the RFIC element group 100a may be disposed together with the transfer sheet 21 on the plurality of the antenna patterns 61 of the antenna substrate 60. Specifically, the RFIC element group 100a is disposed on the plurality of the antenna patterns 61 of the antenna substrate 60, and the holding tool 22 detaches the transfer sheet 21. This eliminates the need for a step of separately attaching a protective cover to the RFID tags, so that the productivity can further be increased.

Therefore, in FIG. 8D, a sheet with insulating adhesive material having strong adhesiveness for an RFID tag or an adhesive sheet having strong adhesiveness is used for the transfer sheet 21 to bond the RFID element 100 to the adhesive sheet. In FIG. 8E, the RFID elements 100 are held at the predetermined interval A. Subsequently, as shown in FIGS. 8F and 8G, the RFID elements 100 are aligned with predetermined positions of the antenna patterns 61, and the antenna substrate 60 and the transfer sheet 21 are affixed to each other to attach the RFID elements 100 to the antenna pattern 61. In this case, the RFID elements 100 are sandwiched between the antenna substrate 60 and the transfer sheet 21 and therefore brought into contact with the antenna pattern 61 due to the adhesive force of the transfer sheet 21.

Figure 16:
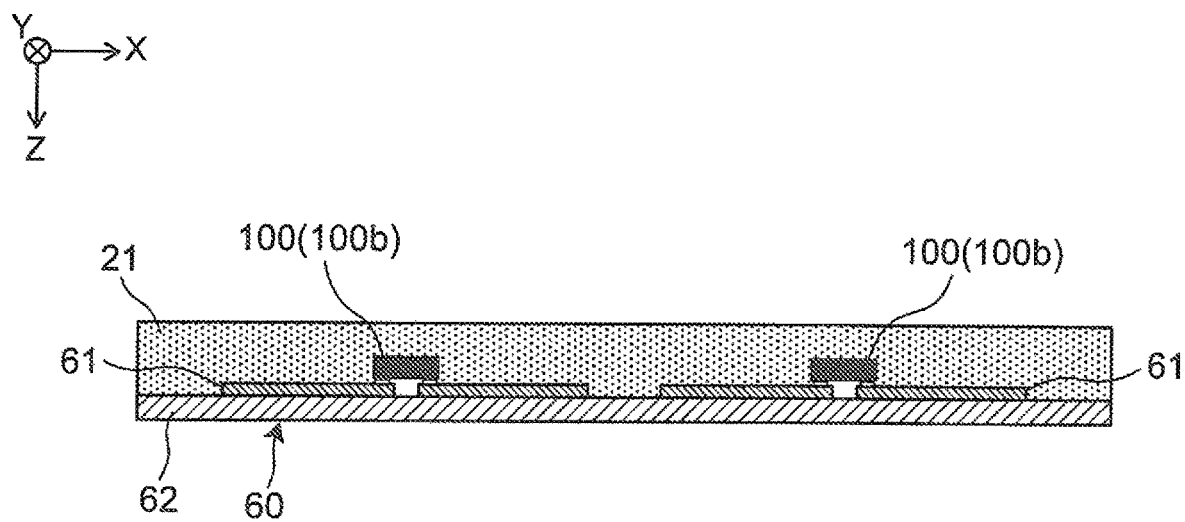
FIG. 16 is a view showing another example of the disposing step of the RFID tag manufacturing method in the first exemplary embodiment when a transfer sheet is used as a protective cover.

FIG. 16 shows another example of the disposing step of the RFID tag manufacturing method when the transfer sheet 21 is used as a protective cover. As shown in FIG. 16, in the step shown in FIG. 8G, the transfer sheet 21 is left affixed onto the antenna substrate 60 without being peeled off so that the transfer sheet 21 can be used as a protective cover for the RFIC elements 100 etc. By leaving the transfer sheet 21 attached even when the RFIC elements 100 are singulated into individual pieces, the need for a conductive adhesive is eliminated so that the RFID tags can be manufactured with the steps not including a heating step for curing an adhesive or a step of peeling the transfer sheet. As a result, materials having low heat resistance properties (paper, PET, or PE film) can be used for the RFID tags, which increases a degree of freedom in design and a production efficiency of the RFID tags.

In the first embodiment, the transfer sheet 21 having a plurality of the RFIC elements 100 (the RFIC element group 100a) transferred thereto may be manufactured by using the arranging step ST10 and a portion of the disposing step ST20 of the RFID tag manufacturing method and may be provided to a user. Therefore, the first embodiment is applicable to a method of manufacturing the transfer sheet 21 having a plurality of the RFIC elements 100 transferred thereto. This enables the user to easily manufacture the RFID tags by using a conventional device to transfer to the antenna substrate 60 including a plurality of the antenna patterns 61 the transfer sheet 21 having a plurality of the RFIC elements 100 transferred thereto.

For elements forming the manufacturing device 1, for example, a memory storing a program allowing these elements to function and a processing circuit or a control part corresponding to a processor such as a CPU (Central Processing Unit) may be included, and the processor may execute the program so as to function as these elements.

Second Embodiment

An RFID tag manufacturing method of a second embodiment will be described.

In the second embodiment, differences from the first embodiment will mainly be described. In the second embodiment, the same or equivalent exemplary elements as the first embodiment are denoted by the same reference numerals in the description. In the second embodiment, descriptions overlapping with the first embodiment will not be made in detail.

Figure 17:
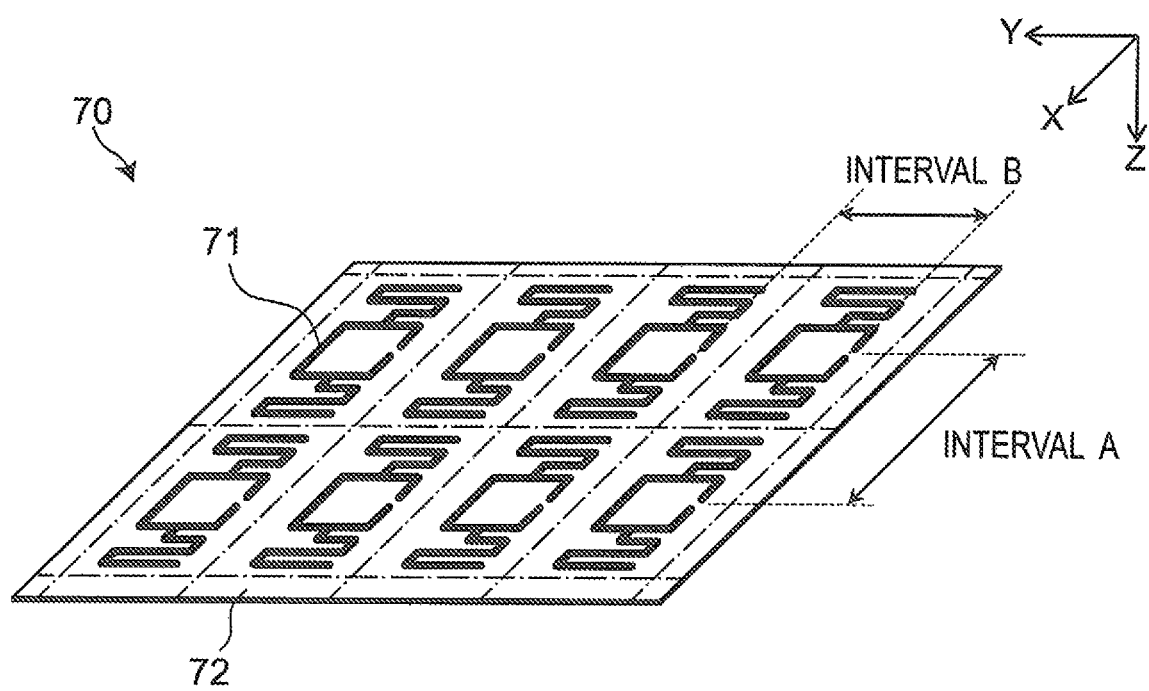
FIG. 17 is a perspective view showing an example of the antenna substrate.

FIG. 17 is a perspective view showing an example of an antenna substrate 70. As shown in FIG. 17, the antenna substrate (cut sheet) 70 used in the second embodiment includes a plurality of antenna patterns 71 and a base film 72. The antenna substrate 70 of the second embodiment has the plurality of the antenna patterns 71 having a more complicated shape than the antenna substrate 60 of the first embodiment. Specifically, the patterns are dipole antennas each having a pair of meander-shaped dipole elements and a matching loop. The intervals A, B of the plurality of the antenna patterns 71 of the antenna substrate 70 of the second embodiment are larger than the intervals A, B of the plurality of the antenna patterns 61 of the antenna substrate 60 of the first embodiment. In the second embodiment, the antenna substrate 70 has the plurality of the antenna patterns 71 arranged in two rows in the X direction and four lines in the Y direction in a planar view. In the second embodiment, the antenna substrate 70 is not limited thereto.

Figure 18A:
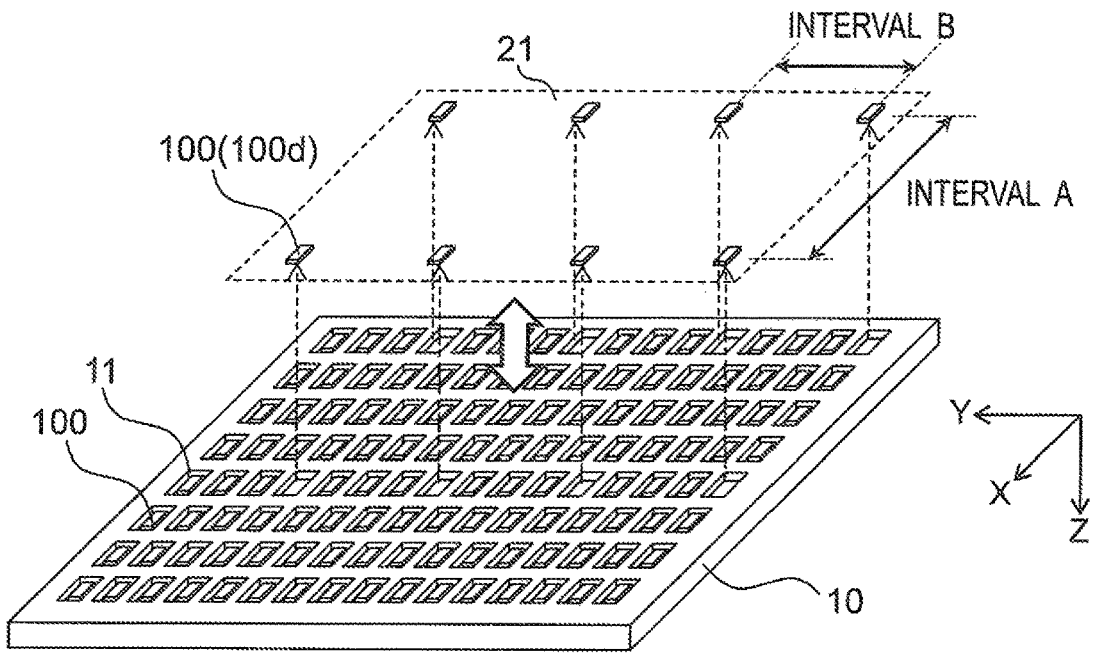
FIG. 18A is a view showing an example of a disposing step of an RFID tag manufacturing method in a second exemplary embodiment.
Figure 18B:
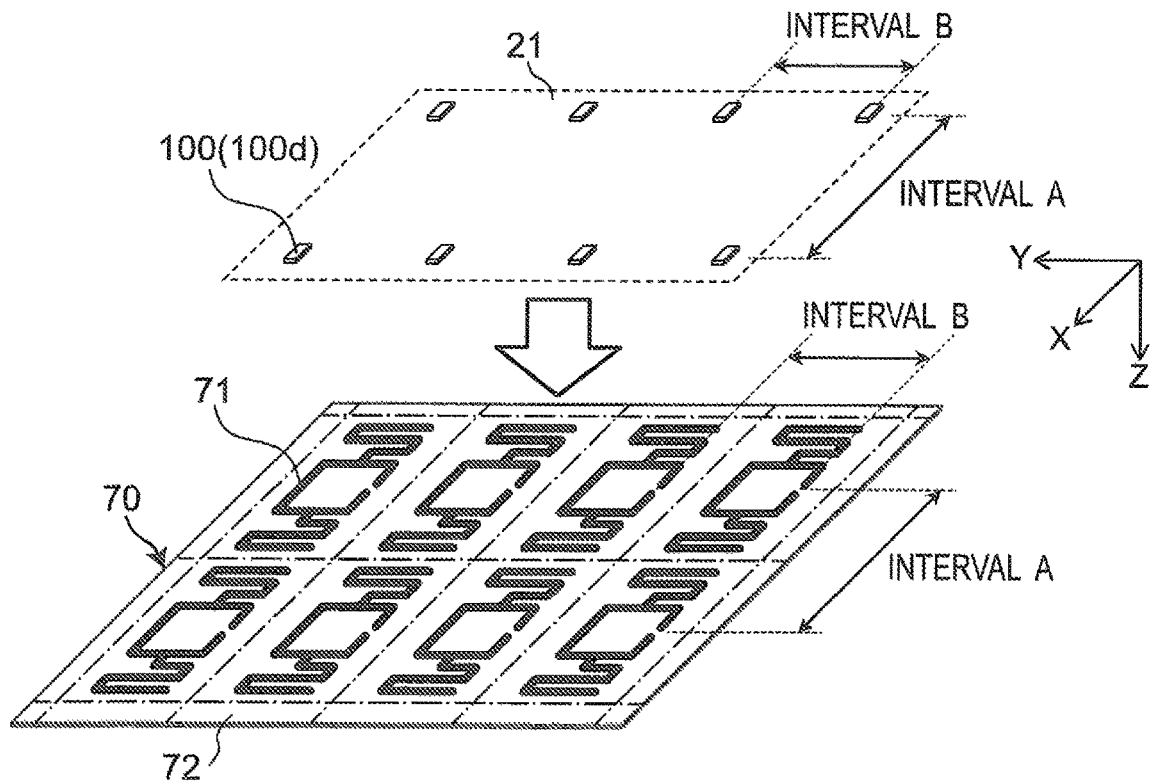
FIG. 18B is a view showing an example of the disposing step of the RFID tag manufacturing method in the second exemplary embodiment.
Figure 18C:
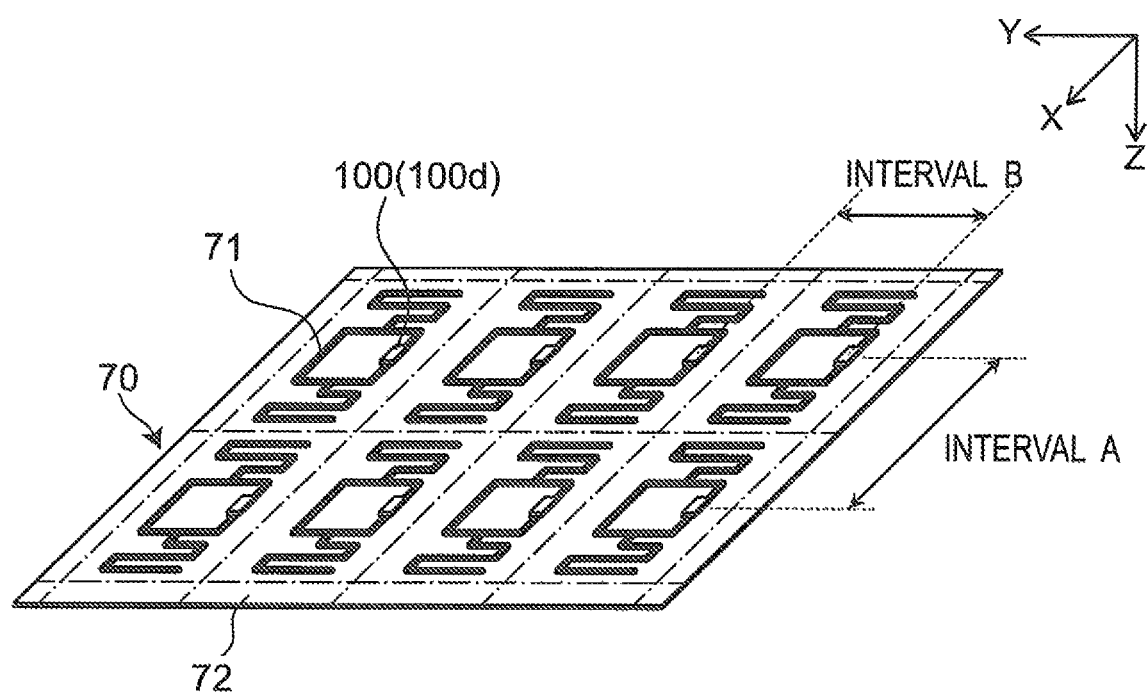
FIG. 18C is a view showing an example of the disposing step of the RFID tag manufacturing method in the second exemplary embodiment.

FIGS. 18A to 18C are views showing an example of the RFID tag manufacturing method in the second embodiment.

As shown in FIG. 18A, the housing tool 10 of the second embodiment has a plurality of the housing parts 11 formed in eight rows in the X direction and 16 lines in the Y direction in the planar view. In the second embodiment, the plurality of the antenna patterns 71 of the antenna substrate 70 is arranged at the interval A in the X direction and at the intervals B in the Y direction, while the plurality of the housing parts 11 of the housing tool 10 is arranged at intervals A/4 in the X direction and at intervals B/4 in the Y direction in the planar view. In the second embodiment, the housing tool 10 is not limited thereto.

In the second embodiment, a plurality of the RFIC elements 100 are housed in the housing tool 10 in the arranging step ST10. Subsequently, in the disposing step ST20, an RFIC element group 100d is extracted out of the plurality of the RFIC elements 100 of the housing tool 10 by the transfer sheet 21. The RFIC element group 100d has the second arrangement density lower than the first arrangement density and corresponding to the arrangement density of the plurality of the antenna patterns 71 arranged on the antenna substrate 70. Specifically, the plurality of the RFIC elements 100 included in the RFIC element group 100d is arranged at the interval A in the X direction and the intervals B in the Y direction in the planar view.

As shown in FIG. 18B, the RFIC element group 100d extracted by the transfer sheet 21 is disposed on the plurality of the antenna patterns 71 of the antenna substrate 70 while maintaining the second arrangement density at the time of the extraction.

As a result, as shown in FIG. 18C, the RFIC element group 100d is disposed on the plurality of the antenna patterns 71 of the antenna substrate 70. Subsequently, terminals of the RFIC elements 100 of the RFIC element group 100d and terminals of the antenna patterns 71 are respectively bonded by solder or anisotropic conductive paste, for example. The antenna substrate 70 having the RFIC elements 100 mounted thereon is singulated into individual pieces by a singulating device (not shown). As a result, RFID tags are manufactured.

Subsequently, a plurality of the RFIC elements 100 in rows different from the rows of the extracted RFIC element group 100d is extracted as the next RFIC element group from the housing tool 10 and disposed on a plurality of the antenna patterns 71 of another antenna substrate 70. This operation is repeated.

[Effects]

According to the RFID tag manufacturing method of the second embodiment, the following effects can be produced.

According to the RFID tag manufacturing method of the second embodiment, a plurality of RFID tags can be manufactured in a short time, so that the productivity can be increased. According to the RFID tag manufacturing method of the second embodiment, the attachment position accuracy of the RFIC elements 100 can be improved.

Third Embodiment

An RFID tag manufacturing method according to the third embodiment of the present invention will be described.

In the third embodiment, differences from the first embodiment will mainly be described. In the third embodiment, the same or equivalent exemplary elements as the second embodiment are denoted by the same reference numerals in the description. In the third embodiment, descriptions overlapping with the second embodiment will not be made in detail.

Figure 19:
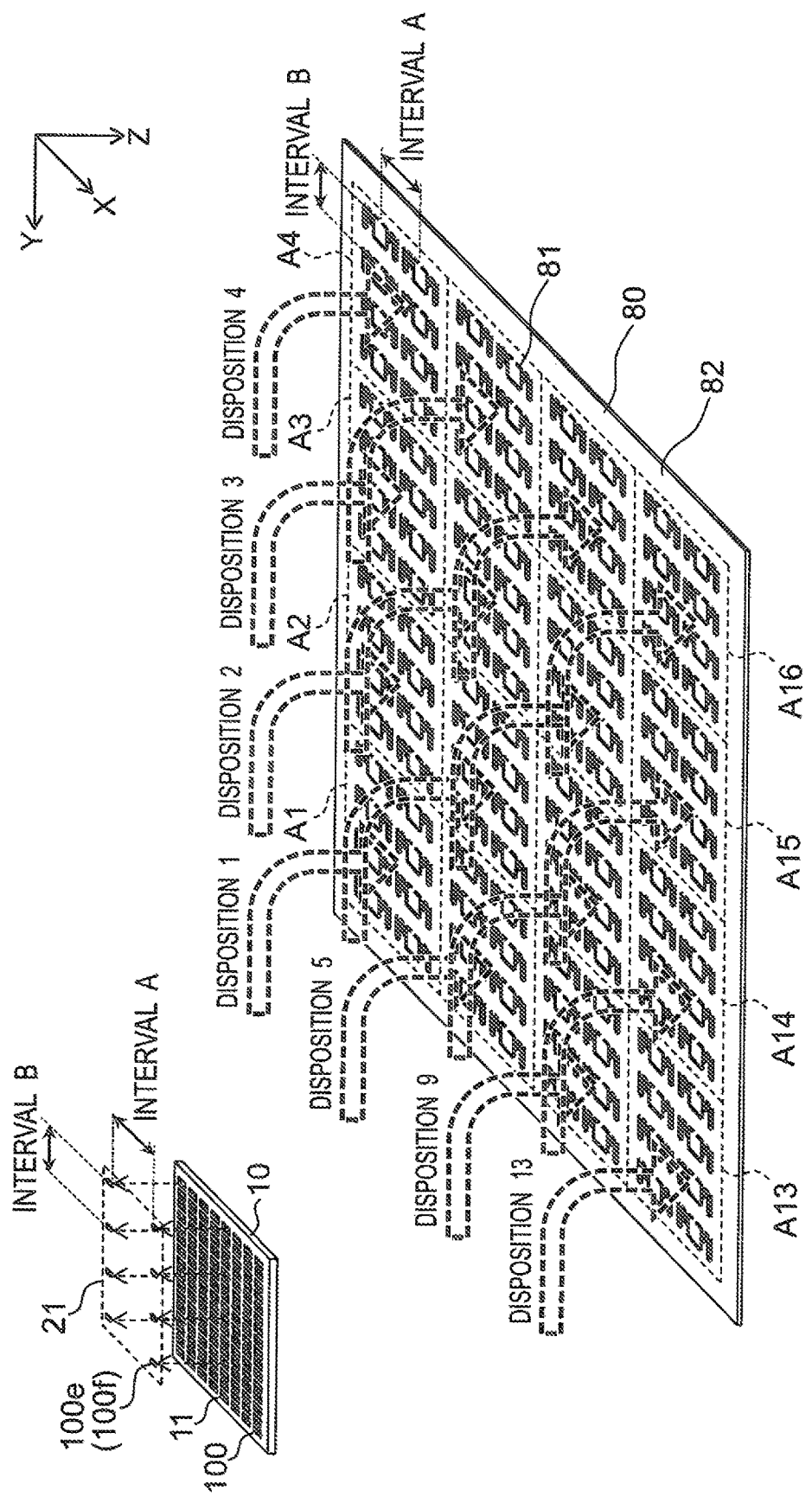
FIG. 19 is a view showing an example of a disposing step of an RFID tag manufacturing method in a third exemplary embodiment.

FIG. 19 is a view showing an example of the RFID tag manufacturing method in the third embodiment. As shown in FIG. 19, in the RFID tag manufacturing method of the third embodiment, a plurality of antenna patterns 81 of an antenna substrate (cut sheet) 80 is divided into a plurality of regions A1 to A16 so that the RFIC elements 100 are disposed on the plurality of the antenna pattern 81.

In the third embodiment, the antenna substrate 80 has the plurality of the antenna patterns 81 arranged in eight rows in the X direction and 16 lines in the Y direction in a planar view. The plurality of the antenna patterns 81 is arranged on a base film 82 at the intervals A in the X direction and the intervals B in the Y direction in the planar view. In the third embodiment, the antenna substrate 80 is not limited thereto.

In the third embodiment, the housing tool 10 has a plurality of the housing parts 11 arranged in eight rows in the X direction and 16 lines in the Y direction in the planar view. While the plurality of the antenna patterns 81 is arranged at the intervals A in the X direction and the intervals B in the Y direction in the planar view, the plurality of the housing parts 11 is arranged at intervals A/4 in the X direction and at intervals B/4 in the Y direction in the planar view. In the third embodiment, the housing tool 10 is not limited thereto.

As shown in FIG. 19, in the RFID tag manufacturing method of the third embodiment, the plurality of the antenna patterns 81 of the antenna substrate 80 is divided into the regions A1 to A16 including a total of the eight antenna patterns 81 in two rows in the X direction and four lines in the Y direction in the planar view.

In the RFID tag manufacturing method of the third embodiment, an RFIC element group 100e is extracted from the housing tool 10, including the eight RFIC elements 100 arranged at the same intervals as the intervals A, B of the eight antenna patterns in the region A1 of the antenna substrate 80. The RFIC element group 100e is disposed on the antenna pattern 81 in the region A1 of the antenna substrate 80 while maintaining the intervals.

Subsequently, an RFIC element group 100f is extracted from the housing tool 10, including the eight RFIC elements 100 arranged at the same intervals as the intervals A, B of the eight antenna patterns in the region A2 of the antenna substrate 80. The RFIC element group 100f is extracted from rows different from the rows from which the RFIC element group 100e is extracted in the housing tool 10. The extracted RFIC element group 100f is disposed on the antenna pattern 81 in the region A2 of the antenna substrate 80.

By performing this disposition work in each of the regions A3 to A16, the RFIC elements 100 are disposed in all the antenna patterns 81 of the antenna substrate 80. While the disposition operation is repeated, an arrangement work of the RFIC elements 100 is performed for the housing tool 10 to be used next. Specifically, the arranging step ST10 is performed for another housing tool 10. As a result, the RFIC elements 100 can continuously be disposed on the antenna patterns 81 of the antenna substrate 80.

[Effects]

According to the RFID tag manufacturing method of the third embodiment, the following effects can be produced.

According to the RFID tag manufacturing method of the third embodiment, a plurality of RFID tags can be manufactured in a short time, so that the productivity can be increased. According to the RFID tag manufacturing method of the third embodiment, the attachment position accuracy of the RFIC elements 100 can be improved.

In the example described in the third embodiment, the plurality of the antenna patterns 81 of the antenna substrate 80 is divided into the 16 regions A1 to A16; however, the present invention is not limited thereto. The number and size of the regions may be changed depending on the number of the housing parts 11 of the housing tool 10 etc.

In the example described in the third embodiment, the plurality of the antenna patterns 81 is arranged at the interval A in the X direction and at the intervals B in the planar view in all the regions A1 to A16; however, the present invention is not limited thereto. For example, the intervals of the plurality of the antenna patterns 81 may be changed for each region.

Although the present invention has been sufficiently described in terms of preferable embodiments with reference to the accompanying drawings, various modifications and corrections are apparent to those skilled in the art. It should be understood that such modifications and corrections are included in the present invention without departing from the scope of the present invention according to the accompanying claims.

The RFID tag manufacturing method of the present invention can improve productivity while maintaining the attachment position accuracy of the RFIC elements to the antenna patterns. Therefore, the method is useful for manufacturing of RFID tags.

EXPLANATIONS OF LETTERS OR NUMERALS 1 manufacturing device
10 housing tool
11 housing parts
20 disposing device
21 transfer sheet
22 holding tool
23 mask
24 through-hole
25 stage
26 moving device
30 conveying stage
60 antenna substrate
61 antenna pattern
62 base film
70 antenna substrate
71 antenna pattern
80 antenna substrate
81 antenna pattern
82 base film
100 RFIC element
100a, 100b, 100c, 100d, 100e, 100f RF element group

The invention claimed is:

1. An RFID tag manufacturing method comprising:
   arranging a plurality of RFIC elements in a housing tool at a first arrangement density;
   extracting an RFIC element group from the plurality of RFIC elements arranged in the housing tool, where the RFIC element group has a second arrangement density that is lower than the first arrangement density and that corresponds to an arrangement density of a plurality of antenna patterns arranged on an antenna substrate; and
   disposing the extracted RFIC element group onto the plurality of antenna patterns of the antenna substrate to maintain the second arrangement density.

2. The RFID tag manufacturing method according to claim 1, wherein the extracting of the RFIC element group comprises extracting from the housing tool the RFIC element group in an X direction at an interval that is m or more times as large as an interval of the plurality of RFIC elements arranged in the X direction in the housing tool, and wherein m is an integer of 2 or more.

3. The RFID tag manufacturing method according to claim 2,
   wherein the plurality of antenna patterns is arranged at an interval A in the X direction and an interval B in a Y direction in a planar view of the antenna substrate,
   wherein the plurality of RFIC elements are arranged in the housing tool at an interval A/m in the X direction and an interval B/n in the Y direction in a planar view of the housing tool, wherein n is an integer of at least 1,
   wherein a number of RFIC elements arranged in the housing tool in the X direction of the plurality of RFIC elements is 2m or more while the number of RFIC elements arranged in the Y direction thereof is n or more, and
   wherein the RFIC element group includes a plurality of RFIC elements arranged at the interval A in the X direction and the interval B in the Y direction in the planar view out of a plurality of RFIC elements in S-th and (S+m)-th rows in the X direction of the housing tool, and wherein S is an integer of at least 1.

4. The RFID tag manufacturing method according to claim 1, wherein the extracting and disposing of the RFIC element group includes using a transfer sheet to extract the RFIC element group from the housing tool, and transferring the extracted RFIC element group to the antenna substrate.

5. The RFID tag manufacturing method according to claim 4, wherein the extracting of the RFIC element group includes by bonding the plurality of RFIC elements arranged in the housing tool to the transfer sheet via a mask having a plurality of through-holes formed at an arrangement density corresponding to the second arrangement density.

6. The RFID tag manufacturing method according to claim 4, wherein the extracting of the RFIC element group includes transferring the RFIC element group together with the transfer sheet to the plurality of antenna patterns of the antenna substrate.

7. The RFID tag manufacturing method according to claim 1, wherein the extracting of the RFIC element group includes using a plurality of suction nozzles to extract the RFIC element group from the housing tool.

8. The RFID tag manufacturing method according to claim 1, further comprising:
after disposing the RFIC element group on the plurality of antenna patterns of the antenna substrate, extracting another RFIC element group from a plurality of RFIC elements arranged in rows different from the rows from which the RFIC element group is extracted in the housing tool; and
disposing the another RFIC element group onto a plurality of antenna patterns of another antenna substrate.

9. A device for manufacturing an RFID tag, the device comprising:
a housing tool configured to arrange a plurality of RFIC elements at a first arrangement density; and
an extracting device configured to extract an RFIC element group from the plurality of RFIC elements arranged in the housing tool, where the extracted RFIC element group has a second arrangement density that is lower than the first arrangement density and that corresponds to an arrangement density of a plurality of antenna patterns arranged on an antenna substrate; and
an RFIC element group disposing device configured to dispose the RFIC element group onto the plurality of antenna patterns of the antenna substrate to maintain the second arrangement density.

10. The RFID tag manufacturing device according to claim 9, wherein the extracting device is configured to extract the RFIC element group in an X direction at an interval that is m or more times as large as an interval of the plurality of RFIC elements arranged in the X direction in the housing tool, and wherein m is an integer of 2 or more.

11. The RFID tag manufacturing device according to claim 10,
wherein the plurality of antenna patterns is arranged at an interval A in the X direction and an interval B in a Y direction in a planar view of the antenna substrate,
wherein the plurality of RFIC elements are arranged in the housing tool at an interval A/m in the X direction and an interval B/n in the Y direction in a planar view of the housing tool, wherein n is an integer of at least 1,
wherein a number of RFIC elements arranged in the housing tool in the X direction of the plurality of RFIC elements 2m or more while the number of RFIC elements arranged in the Y direction thereof is n or more, and wherein the RFIC element group includes a plurality of RFIC elements arranged at the interval A in the X direction and the interval B in the Y direction in the planar view out of a plurality of RFIC elements in S-th and (S+m)-th rows in the X direction of the housing tool, and wherein S is an integer of at least 1.

12. The RFID tag manufacturing device according to claim 9, wherein the extracting device includes a holding tool configured to hold a transfer sheet for extracting the RFIC element group from the housing tool, and the RFIC element group disposing device is configured to transfer the RFIC element group to the antenna substrate.

13. The RFID tag manufacturing device according to claim 12, wherein the extracting device includes a mask having a plurality of through-holes formed at an arrangement density corresponding to the second arrangement density.

14. The RFID tag manufacturing device according to claim 13, wherein the holding tool is configured to detach the transfer sheet when the RFIC element group is disposed on the plurality of antenna patterns of the antenna substrate and transfer the RFIC element group together with the transfer sheet to the plurality of antenna patterns of the antenna substrate.

15. The RFID tag manufacturing device according to claim 9, wherein the RFIC element group disposing device includes a plurality of suction nozzles configured to extract the RFIC element group from the housing tool and dispose the RFIC element group onto the plurality of antenna patterns of the antenna substrate.

16. The RFID tag manufacturing device according to claim 9,
wherein the extracting device is further configured to after the RFIC element group is disposed on the plurality of antenna patterns of the antenna substrate, extract another RFIC element group from a plurality of RFIC elements arranged in rows different from the rows from which the RFIC element group is extracted in the housing tool, and
wherein the RFIC element group disposing device is further configured to dispose the another RFIC element group onto a plurality of antenna patterns of another antenna substrate.

17. A manufacturing method for a transfer sheet to which a plurality of RFIC elements is transferred, the method comprising:
arranging a plurality of RFIC elements in a housing tool at a first arrangement density;
bonding an RFIC element group of the plurality of RFIC elements arranged in the housing tool to a transfer sheet, where the RFIC element group has a second arrangement density that is lower than the first arrangement density and that corresponds to an arrangement density of a plurality of antenna patterns arranged on an antenna substrate.

18. The manufacturing method according to claim 17, wherein the bonding of the RFIC element group to the transfer sheet includes extracting from the housing tool the RFIC element group in an X direction at an interval that is m or more times as large as an interval of the plurality of RFIC elements arranged in the X direction in the housing tool, and wherein m is an integer of 2 or more.

19. The manufacturing method according to claim 18, wherein the plurality of antenna patterns is arranged at an interval A in the X direction and an interval B in a Y direction in a planar view of the antenna substrate, wherein the plurality of RFIC elements are arranged in the housing tool at an interval A/m in the X direction and an interval B/n in the Y direction in a planar view of the housing tool, wherein n is an integer of at least 1, wherein a number of elements arranged in the housing tool in the X direction of the plurality of RFIC elements is 2m or more while the number of RFIC elements arranged in the Y direction thereof is n or more, and wherein the RFIC element group includes a plurality of RFIC elements arranged at the interval A in the X direction and the interval B in the Y direction in the planar view out of a plurality of RFIC elements in S-th and (S+m)-th rows in the X direction of the housing tool, and wherein S is an integer of at least 1.

20. The manufacturing method according to claim 17, wherein the bonding of the RFIC element group to the transfer sheet includes bonding the plurality of RFIC elements to the transfer sheet via a mask having a plurality of through-holes formed at an arrangement density corresponding to the second arrangement density.

* * * * *